United States Patent
Perreault et al.

(10) Patent No.: US 10,700,589 B2
(45) Date of Patent: Jun. 30, 2020

(54) WIDE-OPERATING-RANGE RESONANT-TRANSITION SOFT-SWITCHED CONVERTER

(71) Applicant: Massachusetts Institute of Technology, Cambridge, MA (US)

(72) Inventors: David J. Perreault, Andover, MA (US); Alex J. Hanson, Cambridge, MA (US); Seungbum Lim, Cambridge, MA (US); Rachel S. Yang, Leonia, NJ (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

(21) Appl. No.: 16/089,104

(22) PCT Filed: Apr. 28, 2017

(86) PCT No.: PCT/US2017/030130
§ 371 (c)(1),
(2) Date: Sep. 27, 2018

(87) PCT Pub. No.: WO2017/190007
PCT Pub. Date: Nov. 2, 2017

(65) Prior Publication Data
US 2019/0109530 A1    Apr. 11, 2019

Related U.S. Application Data

(60) Provisional application No. 62/329,249, filed on Apr. 29, 2016.

(51) Int. Cl.
*H02M 3/158*    (2006.01)
*H02M 1/08*     (2006.01)
(Continued)

(52) U.S. Cl.
CPC .......... *H02M 1/083* (2013.01); *H02M 3/158* (2013.01); *H02M 3/1582* (2013.01);
(Continued)

(58) Field of Classification Search
CPC ........ H02M 1/32; H02M 1/4225; H02M 1/44; H02M 1/83; H02M 3/10;
(Continued)

(56) References Cited

U.S. PATENT DOCUMENTS 5,734,258 A * 3/1998 Esser .................. H02M 3/1582
                                                    323/224
6,166,527 A * 12/2000 Dwelley ............. H02M 3/1582
                                                    323/222
(Continued)

FOREIGN PATENT DOCUMENTS

WO    WO 2015/069516 A1    5/2015

OTHER PUBLICATIONS

Bose; "Progression of Power Electronics—Its Impact on Energy and Environment;" Proceedings of the Lasted International Conference; Power and Energy Systems; May 13-15, 2002; 6 pages.
(Continued)

*Primary Examiner* — Yemane Mehari
(74) *Attorney, Agent, or Firm* — Daly, Crowley, Mofford & Durkee LLP

(57) ABSTRACT

In accordance with the concepts, circuits and techniques described herein, a converter circuit is provided having multiple half-bridge switching cells that can be selectively controlled using one or more switching patterns to convert a source voltage to a desired output voltage over wide voltage and power ranges while maintaining zero-voltage switching and/or zero-current switching. The converter circuit includes capacitive elements disposed between center switching nodes of the half-bridge switching cells and fixed
(Continued)

potentials and a magnetic energy storage element coupling the center switching nodes of first and second half-bridge switching cells. A controller is coupled to the converter circuit to monitor, control and apply one or more switching patterns the half-bridge switching cells such that components of the half-bridge switching cells are switched having a minimal or zero voltage (or current) across them.

19 Claims, 15 Drawing Sheets

(51) Int. Cl.
  *H02M 1/44* (2007.01)
  *H02M 1/00* (2006.01)
  *H02M 1/42* (2007.01)
(52) U.S. Cl.
  CPC ............ *H02M 1/4225* (2013.01); *H02M 1/44* (2013.01); *H02M 2001/0058* (2013.01); *H02M 2001/0064* (2013.01); *Y02B 70/126* (2013.01); *Y02B 70/1425* (2013.01); *Y02B 70/1491* (2013.01)
(58) Field of Classification Search
  CPC ....... H02M 3/155–158; H02M 3/1582; H02M 3/1588; H02M 2001/0058; H02M 2001/0064; Y02B 70/126; Y02B 70/1425; Y02B 70/1491
  USPC .......................... 323/271, 272, 282–285, 290
  See application file for complete search history.

(56) References Cited

U.S. PATENT DOCUMENTS

| | | | |
|---|---|---|---|
| 6,507,175 B2 | 1/2003 | Susak et al. | |
| 8,319,483 B2* | 11/2012 | Fishelov | H02M 3/157 323/271 |
| 9,571,005 B2* | 2/2017 | Pahlevaninezhad | H02M 7/5387 |
| 9,923,466 B2* | 3/2018 | Yu | H02M 3/1582 |
| 2003/0205990 A1* | 11/2003 | Wittenbreder, Jr. | H02M 1/34 323/222 |
| 2009/0237043 A1* | 9/2009 | Glovinsky | H02M 1/34 323/235 |
| 2011/0006743 A1* | 1/2011 | Fabbro | H02M 3/1582 323/282 |
| 2015/0022168 A1 | 1/2015 | Mednik et al. | |
| 2015/0069958 A1* | 3/2015 | Yang | H02J 7/0052 320/107 |
| 2015/0084605 A1 | 3/2015 | Ho et al. | |
| 2016/0190932 A1* | 6/2016 | Yu | H02M 3/1582 323/271 |

OTHER PUBLICATIONS

Burdio, et al., "A Comparison Study of Fixed-Frequency Control Strategies for ZVS DC/DC Series Resonant Converters;" Proceedings of the IEEE Power Electronics Specialists Conference (PESC); Jun. 2001; 6 pages.
Ching, et al.; "Review of Soft-Switching Techniques for High-Frequency Switched-Mode Power Converters;" IEEE Vehicle Power and Propulsion Conference (VPPC); Sep. 3-5, 2008; 6 pages.
Choi; Interleaved Boundary Conduction Mode (BCM) Buck Power Factor Correction (PFC) Converter; IEEE Transactions on Power Electronics; vol. 28; No. 6; Jun. 2013; 6 pages.
Environmental Protection Agency (EPA); "Energy Star Program Requirements for Single Voltage External Ac-Dc and Ac-Ac Power Supplies;" online—http://www.energystar.gov/ia/partners/product_specs/program reqs/EPS_Eligibility_Criteria.pdf; Jan. 2008; 8 pages.
European Commission; "Code of Conduct on Energy Efficiency of External Power Supplies," Version 5; Online—http://sunbird.jrc.it/energyefficiency/pdf/Workshop_Nov.2004/PS%20meeting/Code%20of%20Conduct%20for%20PS%20Version%202%2024%20Novernber%202004.pdf; 6 pages.
Fanara; "How Small Devices are Having a Big Impact on U.S. Utility Bills;" Proceedings of International Conference on Energy Efficiency in Domestic Appliances and Lighting (EEDAL); Jun. 2006; 14 pages.
Fortenbery, et al.; "Assessment of the Impacts of Power Factor Correction in Computer Power Supplies on Commercial Building Line Losses;" EPRI Solutions; Mar. 31, 2006; 39 pages.
Hua, et al.; "Novel Zero-Voltage-Transition PWM Converters;" IEEE Transactions on Power Electronics; vol. 9; No. 2; Mar. 1994; 7 pages.
Jain, et al.; "Asymmetrical Pulse Width Modulated Resonant DC/DC Converter Topologies;" Proceedings of the IEEE Power Electronics Specialists Conference (PESC); Jun. 1993; 8 pages.
Lee; "High-Frequency Quasi-Resonant Converter Technologies," Proceedings of the IEEE; vol. 76; No. 4; Apr. 1988; 14 pages.
Lim, et al.; "New AC-DC Power Factor Correction Architecture Suitable for High-Frequency Operation;" IEEE Transactions on Power Electronics; vol. 31; No. 4; Apr. 2016; 13 pages.
Lim, et al.; "Two-Stage Power Conversion Architecture Suitable for Wide Range Input Voltage;" IEEE Transactions on Power Electronics; vol. 30; No. 2; Feb. 2015; 12 pages.
Shamsi, et al.; "Design and Development of Very High Frequency Resonant DC-DC Boost Converters;" IEEE Transactions on Power Electronics; vol. 27; No. 8; Aug. 2012; 9 pages.
Shoyama, et al.; "Balanced Switching Converter to Reduce Common-Mode Conducted Noise;" Power Electronics Specialists Conference; 2001; PESC IEEE $32^{nd}$ Annual; vol. 1; Jan. 2001; 6 pages.
Steigerwald; "A Comparison of Half-Bridge Resonant Converter Topologies;" IEEE Transactions on Power Electronics; vol. 3; No. 2; Apr. 1988; 9 pages.
Steigerwald, "High-Frequency Resonant Transistor DC-DC Converters;" IEEE Transactions on Industrial Electronics; vol. IE:31; No. 2; May 1984; 11 pages.
Steigerwald; "A Review of Soft-Switching Techniques in High Performance DC Power Supplies;" Industrial Electronics, Control and Instrumentation; 1995, Proceedings of the 1995 IEEE IECON $21^{st}$ International Conference; Jan. 1995; 7 pages.
Tsai, et al.; "Constant-Frequency Clamped-Mode Resonant Converters;" IEEE Transactions on Power Electronics; vol. 3; No. 4; Oct. 1988; 14 pages.
Vandelac, et al.; A DC to DC PWM Series Resonant Converter Operated at Resonant Frequency; IEEE Transactions on Industrial Electronics; vol. 35; No. 3; Aug. 1988; 10 pages.
Vorpérian; "Quasi-Square-Wave Converters: Topologies and Analysis;" IEEE Transactions on Power Electronics; vol. 3; No. 2; Apr. 1988; 9 pages.
Youssef, et al.; "A Review and Performance Evaluation of Control Techniques in Resonant Converters;" The $30^{th}$ Annual Conference of the IEEE Industrial Electronics Society; Nov. 2-6, 2004; 7 pages.
80 Plus Specification (Power Supplies); (Online); Available: http://www.80plus.org/80what.htm; 13 pages.
PCT International Search Report of the ISA for PCT Appl. No. PCT/US2017/030130 dated Aug. 29, 2017; 5 pages.
PCT Written Opinion of the ISA for PCT Appl. No. PCT/US2017/030130 dated Aug. 29, 2017; 5 pages.

* cited by examiner

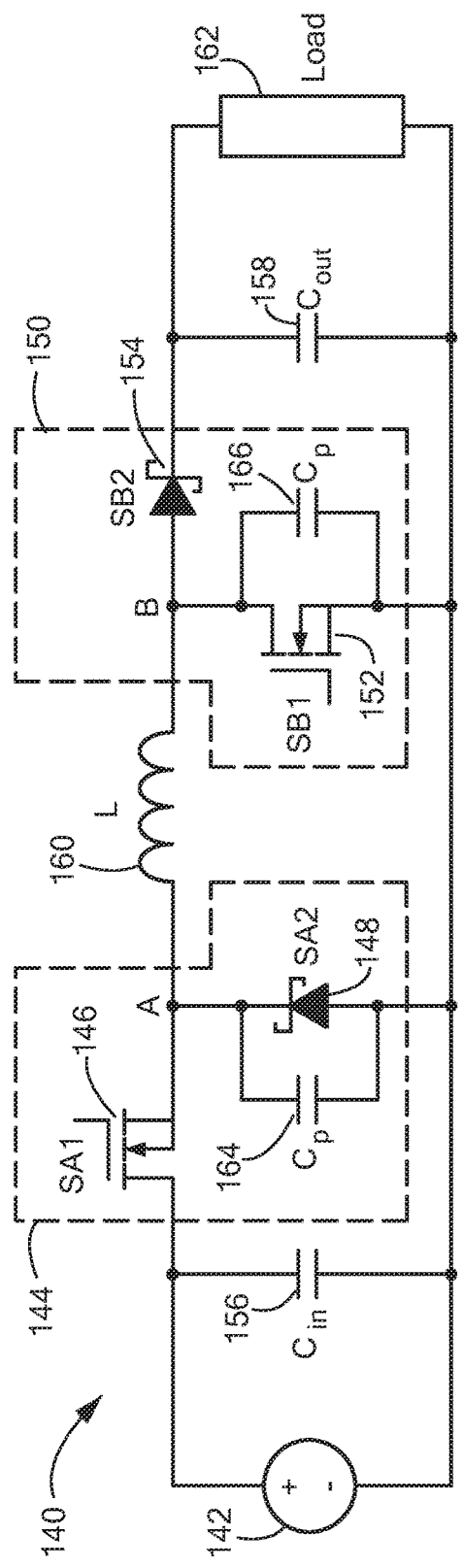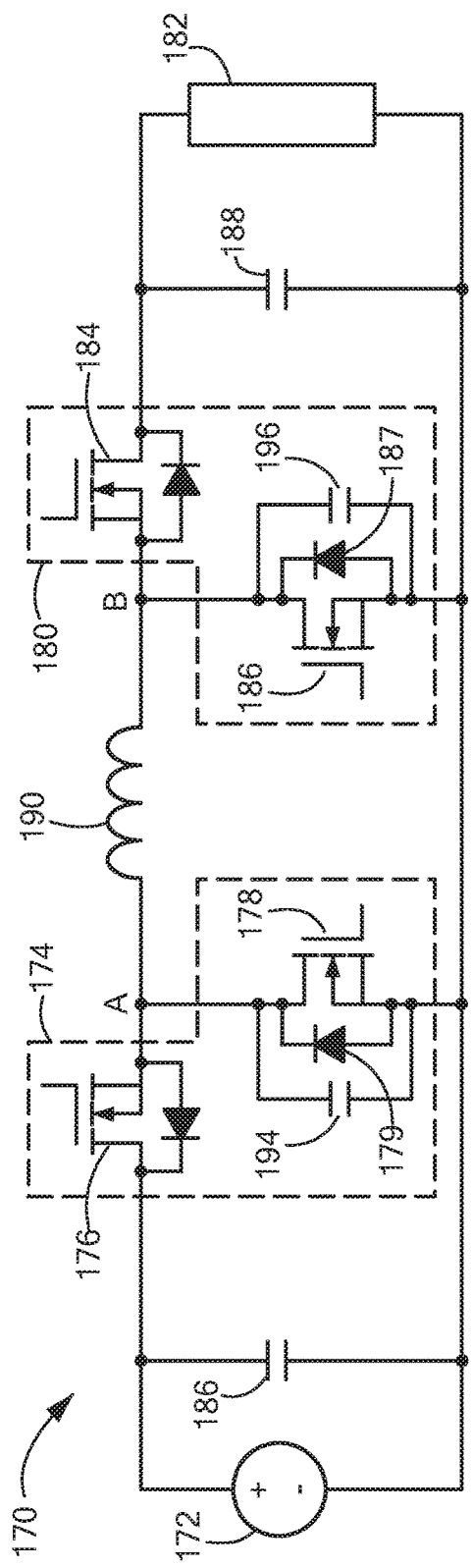
FIG. 1A
FIG. 1B

Energy Storage

LC Resonant "Charge B"

Direct Delivery

LC Resonant "Reset"

Energy Storage

LC Resonant "Charge B"

Direct Delivery

CL Resonant "Discharge A"

Indirect Delivery

CLC Resonant "Reset"

Direct Delivery

CL Resonant "Discharge A"

Indirect Delivery

CL Resonant "Reset"

WIDE-OPERATING-RANGE RESONANT-TRANSITION SOFT-SWITCHED CONVERTER

CROSS REFERENCE TO RELATED APPLICATIONS

This application is a U.S. National Stage of PCT application PCT/US2017/030130 filed in the English language on Apr. 28, 2017, and entitled "WIDE-OPERATING-RANGE RESONANT-TRANSITION SOFT-SWITCHED CONVERTER," which claims the benefit under 35 U.S.C. § 119 of provisional application No. 62/329,249 filed Apr. 29, 2016, which application is hereby incorporated herein by reference.

FIELD

This patent application relates generally to power electronic converters and more particularly, to concepts, circuits and techniques to improve the efficiency and size of power electronic converters having wide operating ranges.

BACKGROUND

As is known in the art, as of 2006, over 28% of electric energy consumption in the United States was attributed to "miscellaneous" electronic loads. As is also known, at that time, the percentage of electrical energy consumed in miscellaneous loads was growing at twice the rate of other loads.

Further, grid-connected loads can lose between 20-70% of their energy consumption during the conversion process. For example, power conversion alone accounted for as much as 4% of the total U.S. electricity consumption in 2006 and that figure is expected to increase.

Applications that require wide operating ranges are especially prone to high losses. Wide operation for the input or output voltage of a dc-dc converter may include a 4:1 range or wider. Wide operation for grid connected ac-dc conversion may include "universal input" (85-265 Vrms on the input) and may be required to operate when the instantaneous input voltage is between 50 V and 375 V. Grid-connected converters also cause losses in their respective power line through low power factor (generating lossy but unused harmonics on the line); this effect alone is estimated at some 2.8% of energy consumption in commercial buildings.

It would, therefore, be desirable to provide power electronics having a high efficiency and power factor while also meeting market demands for power electronics having a smaller size and lower weight than current power electronics otherwise having substantially the same performance capabilities.

SUMMARY

In accordance with the concepts, circuits and techniques described herein, it has been recognized that at least the aforementioned challenges in the design of power electronics also produces opportunities. Some sources estimate that 20-30% energy savings are possible through improved and more widely applied power electronics. While power supply efficiencies can be improved through increased size and cost, this would hinder their proliferation. Therefore, both efficiency and power density of power electronics (e.g. converters) can be improved to sustainably meet present and future energy demands. The concepts, circuits and techniques described herein meet these demands by providing a converter capable of operating efficiently over an operating range which is increased compared with operating ranges of prior art systems. In an embodiment, efficient operation may include meeting an "80-plug" efficiency specifications. For example, meeting such a specification may correspond to a power factor correction (PFC) stage to be about 90% efficient. In higher than 80-plus specifications (bronze, silver, etc.), the PFC stages can range from about 94% efficient to about 96% efficient.

It has also been recognized that to obtain efficiency values in the ranges as indicated above, and/or the high switching frequencies needed to realize high power density, power converters can operate with soft switching (e.g., turning switches on with zero volts across them and turning them off with zero voltage and/or current). Such zero-voltage switching (ZVS) and zero-current switching (ZCS) techniques avoid overlap losses since voltage and/or current are approximately zero during the brief switching transition. These techniques also mitigate switching losses due to parasitics; the energy stored in parasitic capacitances and inductances, which would normally be dissipated in the turn-on and turn-off transients, respectively, are at or near zero at the switching instant. Such switching losses, when present, limit increases in switching frequency, which is especially harmful because high switching frequency is one of the primary routes to achieving high power density. Therefore, soft switching is desirable for achieving both high efficiency and high power density and such an approach may enable power densities of 30 W/in$^3$ or higher (compared with current state-of-the-art converters which may achieve power densities on the order of about 10 W/in$^3$).

It has also been recognized that available soft-switching circuits can achieve very high efficiencies under specific operating conditions. However, performance tends to degrade greatly when operation is required across widely varying voltage and/or power levels. In particular, conventional circuit designs have difficulty in maintaining soft switching waveforms under varying voltage conditions, yet wide voltage specification is very common in dc-dc conversion and is inherent in high power factor ac-dc converters, which can operate over a large portion of the input ac line cycle. Addressing this challenge requires both improved circuit topologies and control strategies.

In order to achieve the promising power density improvements of high frequency operation, described herein is a converter circuit and topology, switching patterns, and control methods to convert power across relatively wide voltage and power ranges and with relatively high efficiency while maintaining ZVS and enabling high-frequency (HF, 3-30 MHz) operation (i.e. a combination of voltage and power ranges and efficiency which are wider and higher, respectively than a combination of voltage and power ranges and efficiency provided by prior art techniques. Example applications includes power factor correction (PFC) converters operating from a universal input (85-265 Vac, rms) to a dc output (e.g., 400 Vdc). In such an application, the converter described herein can achieve ZVS across the entire (wide) input voltage range. This is a clear advantage over a resonant transition boost converter, which only achieves ZVS for input voltages up to one-half of the output voltage. The converter described herein additionally enables direct control of converter currents, and provides natural avenues to avoid inrush currents, which can be problematic for standard boost converters in such an application (as well as other applications). The converter described herein presents opportunities for integration of filter components (e.g. for electromagnetic interference (EMI)) with a main power stage component, offering further improvements to power density.

In addition to boost (voltage step up) operation of the converter described herein, other modes of operation are also possible. The variety of operational modes can apply to a wide range of applications (e.g., dc-dc and ac-dc) and also provide flexible operation within an application. One such advantageous mode transition is explained for the PFC application mentioned above. In general, with the use of all active switches, appropriate mode selection can achieve ZVS for any combination of input and output voltages and for both directions of power transfer.

In accordance with one aspect of the concepts, circuits and techniques described herein, a multi-mode zero voltage switching converter circuit includes first and second half-bridge switching cells, each of the first and second half-bridge switching cells comprising a center switching node, at least two switching elements and an capacitive element, and each of the center switching nodes disposed between the at least two switching elements. The circuit further includes a magnetic energy storage element coupling the center switching nodes of the first and second half-bridge switching cells and a controller coupled to each of the first and second half-bridge switching cells. The controller is configured to selectively switch at least two switching elements in each of the first and second half-bridge switching cells. The controller can be configured to transition the converter circuit between different modes of operation such as, but not limited to, a resonant-transition boost mode and a modified boost mode. Some hardware implementations may also permit voltage step-down modes enumerated in later paragraphs.

In an embodiment, the at least two switching elements include at least one controllable element and the controllable element can be coupled to the controller. The at least two switching elements can include one or more active devices, one or more passive devices, or a combination of active devices and passive devices.

The capacitive element can include a parasitic capacitance value from the at least two switching elements, a discrete capacitance value or a combination of the parasitic capacitance value and the discrete capacitance value.

In some embodiments, the circuit further comprises two or more magnetic energy storage elements coupling the first and second half-bridge switching cells. A zero voltage detector can be coupled to the controller. The zero voltage detector can be configured to detect a zero voltage condition at least one of: the center switching node; the at least two switching elements; or the capacitive element of each of the first and second half-bridge switching cells and the magnetic energy storage element. The zero voltage detector can be coupled to a source voltage and an output voltage of the converter circuit. The zero voltage detector can be configured to generate a zero voltage condition signal when a voltage at the center switching node of either the first or second half-bridge switching cells is less than a voltage threshold.

A zero current detector can be coupled to the controller. The zero current detector can be configured to detect a zero current condition at least one of the center switching node, the at least two switching elements, or the capacitive element of each of the first and second half-bridge switching cells and the magnetic energy storage element. In some embodiments, the zero current detector can be coupled to a source voltage and an output voltage of the converter circuit, and the zero current detector can be configured to generate a zero current condition signal when a current at the center switching node of either the first or second half-bridge switching cells is less than a current threshold.

In another aspect, a method for converting power across wide voltage and power ranges while maintaining zero voltage switching is provided. The method comprises: providing a source voltage to a converter circuit having first and second half-bridge switching cells, each of the first and second half bridge switching cells having one or more switching elements; storing energy in the magnetic energy storage element (e.g. providing charge to or charging a magnetic energy storage element), coupling a first and a second center switching node of the first and second half-bridge switching cells, respectively, wherein first switching elements of the first and second half-bridge switching cells are closed; opening the first switching element of the second half-bridge switching cell to charge the second center switching node of the second half-bridge switching cell, and activating a second switching element of the second half-bridge switching cell to connect to the output.

The method may further include detecting whether a current across the magnetic storage element is less than a predetermined current threshold or optionally inferring a current from timing of the switch states.

The method may further comprise detecting a voltage at the second center switching node of the second half-bridge switching cell is less than a predetermined voltage threshold and closing the first switching element of the second half-bridge switching cell. The source voltage provided to the converter circuit can be determined to be greater than a fraction of an output voltage of the converter circuit and the converter circuit can be transitioned from a first mode of operation to a second mode of operation.

In some embodiments, responsive to opening the first switching element of the second half-bridge switching cell, a capacitive element coupled to the second center switching node of the second half-bridge switching cell can be charged.

The method may further comprise de-activating a first switching element of the first half-bridge switching cell to transfer energy from the input to the magnetic energy storage element and/or to the output. A second switching element of the first half-bridge switching cell can be activated to draw magnetic energy from the magnetic energy storage element. The first and second switches may be activated/de-activated responsive to zero-voltage detection or inference, magnetic energy storage element current detection or inference, and/or timing.

In another aspect, a method for controlling a switching element of a half-bridge switching cell in a converter circuit is provided. The method comprising providing a node voltage from the converter circuit to a low voltage detection circuit, the low voltage detection circuit coupled to a terminal of the switching element, the low voltage detection circuit configured to generate a low voltage signal and a timing signal, detecting a low voltage condition in the converter circuit using the node voltage and generating the low voltage signal, providing the low voltage signal to the terminal of the switching element to activate the switching element, generating the timing signal responsive to the low voltage signal, and determining the timing signal is less than a predetermined time threshold and de-activating the switching element responsive to the determination.

The method may further comprise providing a signal to activate (close) and de-activate (open) the switching element. The signal may be generated by a logic device having a first input coupled to an output of the low voltage detection circuit and a second input coupled to an output of a timing circuit. The node voltage from a center switching node of the half-bridge switching cell can be provided to a voltage divider circuit and an output of a voltage divider circuit can be compared to a voltage threshold to detect the low voltage condition.

In some embodiments, the low voltage detection signal can be generated at a first level when the output of the voltage divider circuit less than the voltage threshold. The low voltage detection signal can be generated at a second level when the output of the voltage divider circuit is greater than or equal to the voltage threshold.

The method may further comprise activating the timing circuit responsive to the low voltage condition. In some embodiments, a ramp voltage may be provided to the timing circuit for the predetermined time threshold and, responsive to timing signal being less than the predetermined time threshold, generating the timing signal can be generated at a second level to de-activate the switching element. The timing signal can be generated at a first level responsive to the ramp voltage falling below a ramp voltage threshold.

BRIEF DESCRIPTION OF THE DRAWINGS

The foregoing features may be more fully understood from the following description of the drawings in which:

FIG. 1A is a schematic diagram which illustrates one possible hardware implementation of a power converter used to illustrate resonant-transition boost and modified boost modes;

FIG. 1B is a schematic diagram of an illustrative embodiment of an all-active switch implementation of a power converter having diodes in parallel with active devices which may be intrinsic body diodes of the devices or discrete components;

DETAILED DESCRIPTION

The converter circuit topology described herein comprises two half-bridge switching cells, capacitances between the center "switching" nodes of each cell and fixed potentials (which may be established, for example, by device capacitances, discrete capacitances, or both) and an inductive element connecting the two switching nodes (referred to herein below as nodes "A" and "B").

Figure 1:
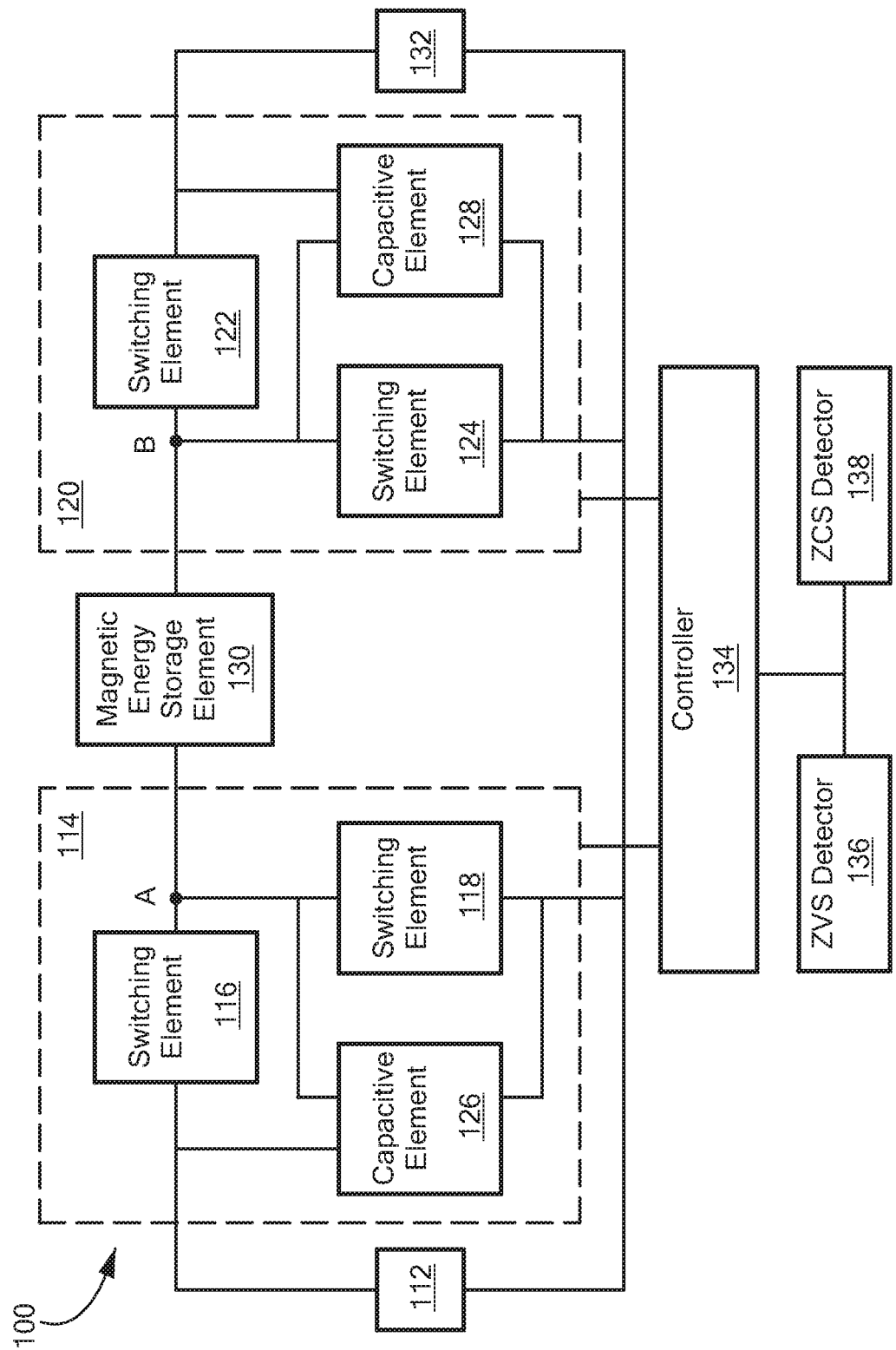
FIG. 1 is a block diagram of a power converter circuit.

Referring now to FIG. 1, an illustrative converter circuit 100 implemented in accordance with one aspect of the concepts sought to be protected herein includes first and second half-bridge switching cells 114, 120, capacitive elements 126, 128 disposed between center switching nodes (identified as nodes A and B in FIG. 1) of each half-bridge switching cell and fixed potentials (which may comprise device capacitances, discrete capacitances, or both) and a magnetic energy storage element 130 coupling the center switching nodes of first and second half-bridge switching cells.

In an embodiment, converter circuit 100 may operate as a soft-switched converter circuit configured to convert a source voltage 112 to a desired load voltage value 132. The source voltage 112 may include a direct current (DC) voltage, a rectified alternating current (AC) voltage, or some other varying voltage. In some embodiments, converter circuit 100 may also interface with AC voltages through a rectifier or by using some switching elements of the converter to also achieve rectification of the AC voltage. First and second half-bridge switching cells 114, 120 can be soft-switched using zero-voltage switching (ZVS) and/or zero-current switching (ZSC) techniques to avoid overlap losses during switching transitions. For example, switching patterns and techniques will be described herein such that a reduced (and ideally minimal or substantially zero) voltage (or current) exists across switching elements 116, 118, 122, 124 when they are turned on or off.

First and second half-bridge switching cells 114, 120 may include one or more active devices, one or more passive devices or a combination of active and passive devices. For example, in some embodiments, each of first and second half-bridge switching cells 114, 120 may include an active device and a passive device. In another embodiment, each of first and second half-bridge switching cells 114, 120 may include two active devices or multiple active devices (e.g., more than two). In still another embodiment, first half-bridge switching cell 114 may include an active device and a passive device and second half-bridge switching cell 120 may include two active devices. The half-bridge switching cells 114, 120 will be described in greater detail below with respect to FIGS. 1A-6.

An active device may include any type of transistor or other switching element, including but not limited to a field effect transistor (FET). The active device may further include bipolar junction transistors (BJT), insulated-gate BJTs (IGBTs), silicon controlled rectifiers (SCR), or mechanical switches.

A passive device may include a diode.

Capacitive elements 126, 128 may include device capacitances, discrete capacitances (e.g., capacitors) or a combination of device capacitances and discrete capacitances. In some embodiments, first and/or second half-bridge switching cells 114, 120 can be designed such that their device capacitances play a direct role in operation of circuit 100. For example, capacitive elements 126, 128 may include parasitic capacitance coupled across the active devices and/or or passive devices making up first and second half-bridge switching cells 114, 120. The parasitic capacitance may include a net lumped parallel device capacitance from the devices (e.g., active devices, passive devices) used to form the respective half-bridge switching cell. The capacitances as described herein, whether parasitic or discrete, may slow the LC, CL, and CLC resonant transitions which can help accurate timing detection and also to avoid high voltage transition rates for some devices. Capacitances may also aid in ignoring (i.e. snub) the turn-off action of the devices, preventing a form of switching loss.

First and/or second half-bridge switching cells 114, 120 may include one or more capacitors in addition to any parasitic capacitance. For example, capacitive elements 26, 28 may include a capacitor coupled across one or more of the active devices and/or passive devices forming the first and second half-bridge switching cells 14, 20. In some embodiments, an input capacitor may be coupled between an input terminal of first half-bridge switching cell 114 and a reference potential and an output capacitor may be coupled between an output of second half-bridge switching cell 120 and a reference potential. Thus, in an embodiment, capacitive elements 126, 128 are connected from the switching nodes to the fixed potentials. There may also be capacitances connected from fixed potentials (e.g. $V_{IN}$, $V_{OUT}$) to other fixed potentials (e.g. ground). It should be appreciated that the different capacitors serve different functions and are connected between different nodes.

It should be appreciated that capacitive elements 126, 128 may be coupled in a variety of different techniques based at least in part on a particular application of converter circuit 100.

Magnetic energy storage element 130 may include one or more inductors. In some embodiments, magnetic energy storage element 130 may include a magnetic structure that provides both energy storage and filtering capabilities on a single core. Magnetic energy storage element 130 is coupled between first and second half-bridge switching cells 114, 120 such that it couples the center switching nodes of each half-bridge switching cell together. However, it should be appreciated that magnetic energy storage element 130 may be provided in circuit 100 in a variety of different ways based at least in part on a particular application of circuit 100. For example, multiple magnetic elements 130 may be provided within a converter circuit (e.g., FIG. 7). In some embodiments, a power stage magnetic energy storage element may be formed within a converter circuit, the power stage magnetic energy storage element having additional magnetic elements formed using the same core to achieve filtering (e.g. EMI filtering) with little extra volume (e.g., FIGS. 8-9). Thus, magnetic storage element 130 may provide desired inductance utilizing a hybrid structure which provides additional functional features (e.g. EMI filtering).

A controller 134 can be coupled to converter circuit 100 to monitor, control and selectively switch switching elements 116, 118, 120, 124 of first and second half-bridge switching cells 114, 120. In some embodiments, the controller 134 can be coupled to switching elements 116, 118, 120, 124 to monitor a voltage, current or both across the respective element. Controller 134 can be configured to generate a turn-on and/or a turn-off signal and provide the turn-on and/or the turn-off signal to a respective one or multiple ones of the switching elements 116, 118, 120, 124 to activate and de-activate the elements. For example, controller 134 can generate and/or apply switching patterns as described herein (e.g., FIGS. 2-4) by turning on and/or one or more of switching elements 116, 118, 120, 124 to convert the source voltage 112 to a desired output voltage 132 and maintain ZVS and ZCS conditions.

Figure 6:
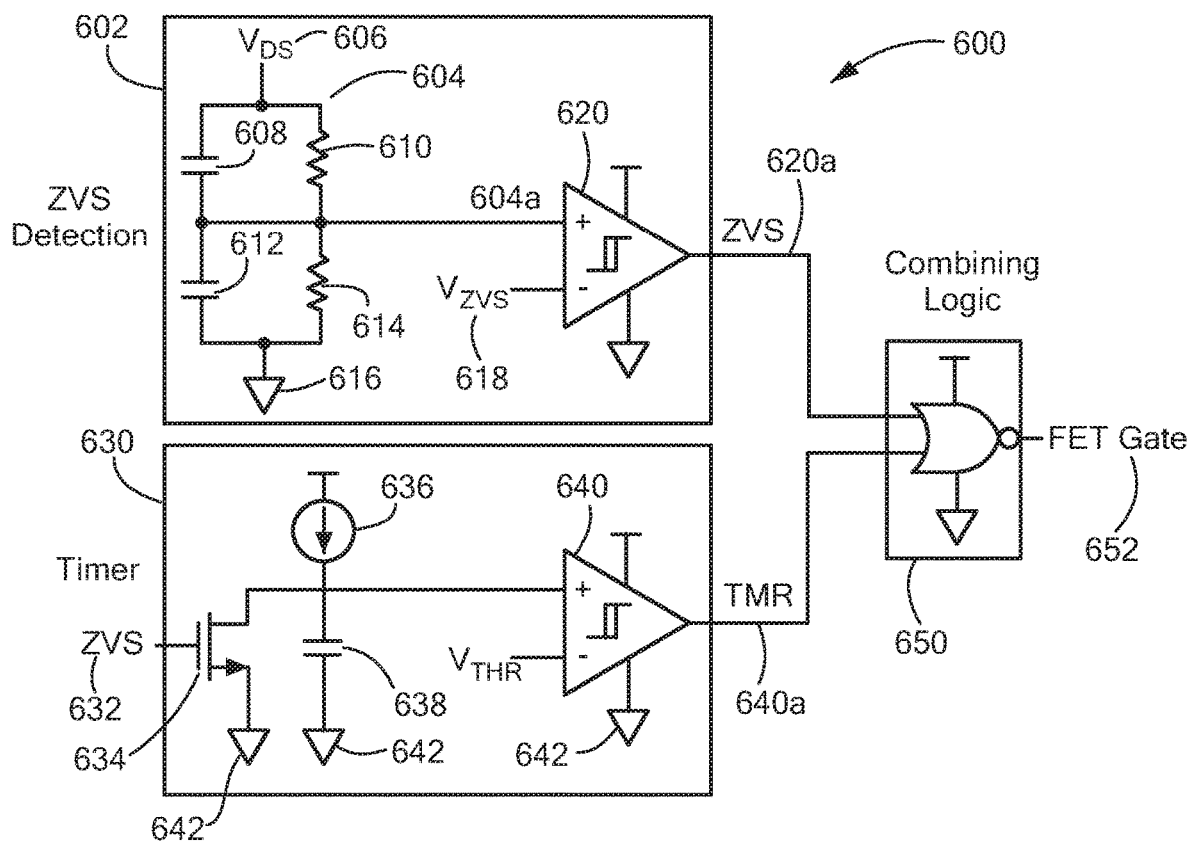
FIG. 6 is a block diagram of an illustrative implementation of a control circuit.

In some embodiments, controller 134 may include a low voltage detection circuit and/or a timing circuit (e.g., FIG. 6). The low voltage detection circuit and/or timing circuit can be coupled to one or more of switching elements 116, 118, 120, 124 (e.g., through a logic gate) to monitor and detect voltage and/or current values at the respective ones of switching elements 116, 118, 120, 124.

Controller 134 can include or be coupled to a ZVS detector 136 and a ZCS detector 138. ZVS detector 136 can be coupled to each of the components of converter circuit 100 to monitor and detect zero voltage conditions and/or detect when a voltage across one or more of the components (e.g., switching elements, capacitive elements, magnetic energy storage elements) has fallen below a voltage threshold. ZCS detector 138 can be coupled to each of the components of converter circuit 100 to monitor and detect zero current conditions and/or detect when a current through one or more of the components (e.g., switching elements, capacitive elements, magnetic energy storage elements) has fallen below a current threshold. Each of ZVS detector 136 and ZCS detector 138 can provide ZVS and ZCS information to controller 134.

Converter circuit 100 can operate in multiple operating modes (i.e. switching patterns). For example, converter circuit 100 may operate in either of a resonant-transition boost mode or a modified boost mode. In some embodiments, converter circuit 100 may transition between the two boost modes. The operating modes (i.e. switching patterns) of the converter circuit 100 and how the control of the converter circuit is accomplished (e.g., maintaining zero voltage switching (ZVS) and controlling current without the need for direct current sensing, which is difficult at high frequency) are further aspects of the concepts described herein that will be described in greater detail at least with respect to FIGS. 2-4.

Now referring to FIG. 1A, a circuit 140 includes first and second half-bridge switching cells 144, 150, capacitive elements 164, 166 disposed between center switching nodes (identified here as A and B) and at least one switching element (here elements 148, 152, respectively) and a magnetic energy storage element 160 coupling the center switching nodes A, B of first and second half-bridge switching cells 144, 150.

A source voltage 142 is coupled to circuit 140 and can be converted using first and second half-bridge switching cells 144, 150 and one or more switching patterns to an output voltage 162 at a desired voltage level. An input capacitor 156 is coupled between an input of first half-bridge switching cell 144 and a fixed potential and an output capacitor 158 is coupled across a second terminal of second half-bridge switching cell 150 and the fixed potential.

First half-bridge switching cell 144 includes a first switching element 146 and a second switching element 148. Second half-bridge switching cell 150 includes a first switching element 152 and a second switching element 154. In the illustrative embodiment of FIG. 1A, first switching elements 146, 152 are provided as field effect transistors (FETs) and second switching elements 148, 154 are provided as diodes. In an embodiment, FETs 146, 152 (i.e., SA1 and SB1) represent controllable elements, with diodes 148, 154 (i.e., SA2, SB2) providing uncontrolled rectification. In an embodiment, controllable elements may refer to elements that can be controlled and switched by a controller (e.g., controller 134 of FIG. 1).

Each of capacitive elements 164, 166 (provided here as capacitances $C_p$) can represent a net lumped parallel device capacitance from the FETs 146, 152 and diodes 148, 154 of first and second half-bridge switching cells 144, 154, respectively, plus any discrete capacitance added to the circuit at their respective nodes It should be appreciated that the illustrative embodiment of FIG. 1A is provided to illustrate one set of operating modes of the converter circuit 140, referred to as the "resonant-transition boost mode" and the "modified boost mode."

Referring now to FIG. 1B, a circuit 170 is provided having an "all active" switch implementation. For example, circuit 170 includes first and second half-bridge switching cells 174, 180, each having first and second switching elements 176, 178, 186, 184 provided as active devices (here FETs). Thus, in the illustrative embodiment of FIG. 1B, each of the first and second switching elements 176, 178, 186, 184 can be controlled (e.g., turned on and off) using zero voltage switching techniques, for example, by a controller (e.g., controller 134 of FIG. 1) to apply one or more switching patterns and convert a source voltage 172 to a desired output voltage 182.

Circuit 170 further includes capacitive elements 194, 196 disposed between center switching nodes (identified here as A and B) and fixed potentials (represented as here as a lumped element connected to the common potential) and a magnetic energy storage element 190 coupling the center switching nodes A, B of first and second half-bridge switching cells 174, 180. An input capacitor 186 is coupled between an input of first half-bridge switching cell 174 and a fixed potential and an output capacitor 196 is coupled across an output of second half-bridge switching cell 180 and the fixed potential.

It should be appreciated that diodes 179, 187 shown in parallel with switching elements 178, 186 (e.g., active devices) respectively, may correspond to intrinsic body diodes of the devices or of discrete components.

Figure 2:
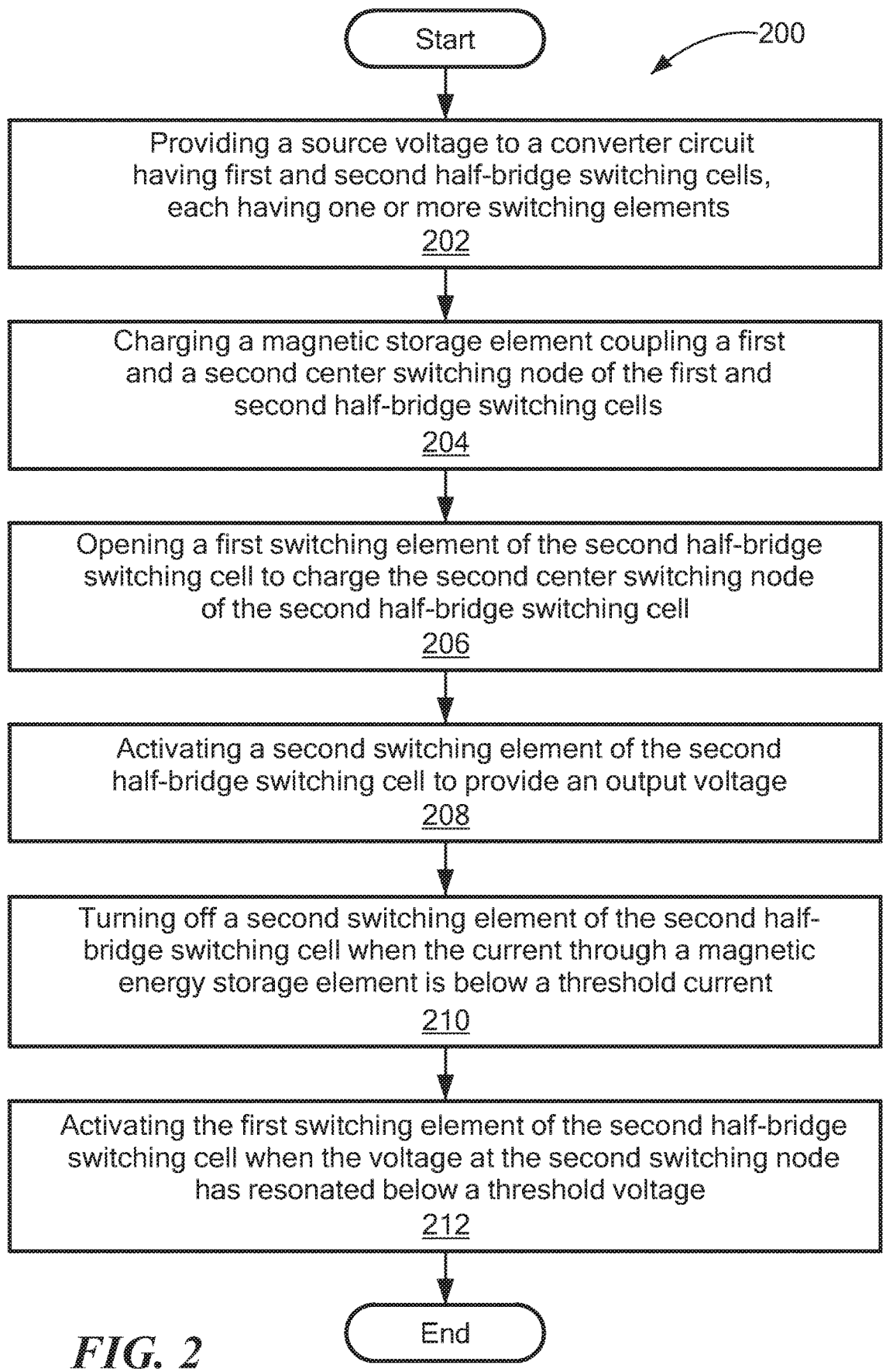
FIG. 2 is a flow diagram of a method for converting power across wide voltage and power ranges while maintaining zero voltage switching in a resonant-transition boost mode.

Now referring to FIG. 2, a method 200 for converting power across wide voltage and power ranges while maintaining zero voltage switching in a resonant-transition boost mode using a connector circuit which may be the same as or similar to the types described above in conjunction with FIGS. 1-1B, begins at block 202, by providing a source voltage to a converter circuit having first and second half-bridge switching cells. The converter circuit includes first and second half-bridge switching cells and can be configured to perform zero voltage switching and/or zero current switching over a wide operating range. One or more switching patterns can be generated by a controller coupled to the converter circuit and the controller can apply the switching patterns to the first and second half-bridge switching cells to achieve zero voltage switching and/or zero current switching for any combination of input and output voltages and for both directions of power transfer.

Each of the first and second half-bridge switching cells can include one or more switching elements that can be selectively controlled by a controller (e.g., controller 134 described above in conjunction with FIG. 1) to convert the source voltage from a first level to a second, different level. For example, a DC source voltage at a first level can be converted to a DC output voltage at a second, different level. In some embodiments, the source voltage can be converted from a variable positive voltage, a DC voltage, or an AC voltage that has been rectified or that may be rectified by co-opting some switching elements of the converter. To perform zero voltage switching and/or zero current switching, the switching elements can be selectively controlled such that they are switched (e.g., turned on and off) when there is zero voltage (or zero current) or substantially zero voltage across them. Thus, the one or more switching patterns can be generated using the controllable switching elements to convert the source voltage to a desired output voltage.

At block 204, a magnetic energy storage element coupling a first and a second center switching node of the first and second half-bridge switching cells, respectively, can be charged. The converter circuit can be configured such that the magnetic energy storage element is disposed between the first and second half-bridge switching cells. In some embodiments, initially, a first switching element of the first half-bridge switching cell and a first switching element of the second half-bridge switching cell can both be closed causing the magnetic energy storage element to charge and store energy. In some embodiments, this may be referred to as an energy storage phase.

At block 206, the first switching element of the second half-bridge switching cell can be opened to charge the second center switching node of the second half-bridge switching cell. In some embodiments, the controller can transmit a signal (e.g., turn-off signal) to a terminal of the first switching element to open the switching element. For example, in one embodiment, the switching element may include an FET and a voltage signal can be provided to one of the terminals of the FET to cause the FET to open.

With the first switching element of the second half-bridge switching cell in an open position, an LC resonant phase charges the center switching node of the second half-bridge switching cell (i.e., second center switching node) to an output voltage (e.g., $V_{out}$) of the converter circuit. In an embodiment, the LC resonant phase can result from the magnetic energy storage element (e.g., inductor) and a capacitive element (e.g., capacitance) coupled across the center switching node and a fixed potential. The capacitive element may include device capacitances and/or discrete capacitances. In some embodiments, this may be referred to as a direct delivery phase.

The capacitive element coupled across the second center switching node of the second half-bridge switching cell can be charged responsive to the opening the first switching element of the second half-bridge switching cell. The LC resonant phase may charge the capacitive element until a second switching element of the second half-bridge switching cell is activated (e.g., turned on). The converter circuit may transition into a "direct" delivery phase responsive to the second switching element being activated. The direct delivery phase may be held for a controlled or predetermined time period during which the current across the magnetic energy storage element decreases.

At block 208, a second switching element of the second half-bridge switching cell can be activated to provide an output voltage. In an embodiment, current may flow directly from the input to the output and through the magnetic energy storage element. In a step-up configuration, energy may be transferred to the output, causing the instantaneous current to decrease.

At block 210, a second switching element of the second half-bridge switching cell can be turned-off when the current through the magnetic energy is at or below a current threshold. In some embodiments, the second switching element can be activated (e.g., turned off or on) responsive to the current across the magnetic energy storage element falling below the current threshold or reaching zero. For example, in one embodiment, the second switching element may include a diode and may turn off responsive to a zero current condition at its input or cathode terminal. The second switching element may include an FET and the FET can be actively controlled to turn on or off responsive to a zero current condition.

In some embodiments, the capacitance at the second center switching node will resonate with the magnetic energy storage element; the voltage can be monitored to detect a zero voltage condition. This phase may be referred to as a reset phase. For example, in some embodiments, the voltage at the second center switching node of the second half-bridge switching cell can be determined to be less than a predetermined voltage threshold.

At block 212, the first switching element of the second half-bridge switching cell can be activated when the voltage at the second switching node has resonated at or below a threshold voltage (e.g., zero volts). For example, responsive to the detection, the first switching element of the second half-bridge switching cell can be closed. The first switching element can be switched with zero volts across it to achieve zero voltage switching and minimize losses during switching transitions. In other embodiments, the voltage threshold may be a nonzero minimum.

It should be appreciated that the converter circuit can operate in multiple modes, such as but not limited to, resonant-transition boost mode and modified boost mode. In some embodiments, the converter circuit can transition between the different modes during operation. For example, the relationship between the source voltage and the output voltage can be monitored. When the source voltage is greater than or equal to a predetermined fraction or percentage of the output voltage the converter circuit can be switching from a first mode of operation to a second, different mode of operation. In one embodiment, the converter circuit can operate in resonant-transition boost mode when the source voltage is less than half of the output voltage (i.e., $V_{in}<V_{out}/2$) and can transition to modified boost mode when the source voltage is determined to be greater than or equal to half the output voltage (i.e., $V_{in}>V_{out}/2$).

In some embodiments, such as in modified boost mode, a first switching element of the first half-bridge switching cell can be de-activated to discharge a capacitive element coupled to the first center switching node of the first half-bridge switching cell. This may be referred to as a CL resonant phase and the CL resonant phase can discharge energy from the capacitive element at the first center switching node until the capacitive element is completely discharged and/or until a second switching element of the first half-bridge switching cell is activated. For example, in some embodiments, the second switching element of the first half-bridge switching cell can be activated to draw magnetic energy from the magnetic energy storage element. This may be referred to as an indirect energy phase and the energy can be supplied from the magnetic energy storage element.

When the current at the magnetic energy storage element falls below the predetermined current threshold (e.g., current at zero), the second switching element of the first half-bridge switching cell and the second switching element of the second half-bridge switching cell can be activated (e.g., turned off). The converter circuit may enter into a CLC resonant reset phase.

Figure 2A:
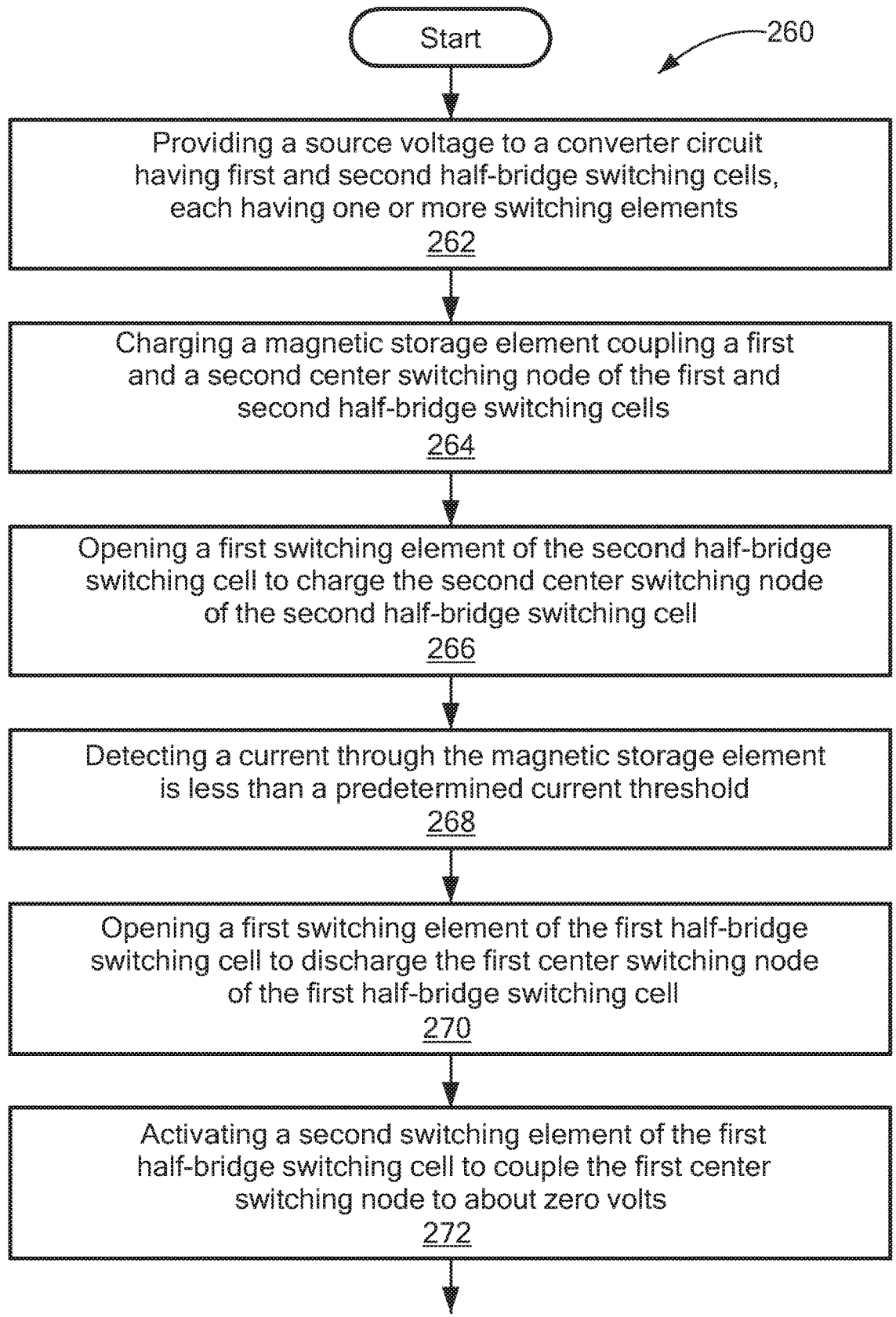
FIGS. 2A-2B is a flow diagram of a method for converting power across wide voltage and power ranges while maintaining zero voltage switching in a modified boost mode.
Figure 2B:
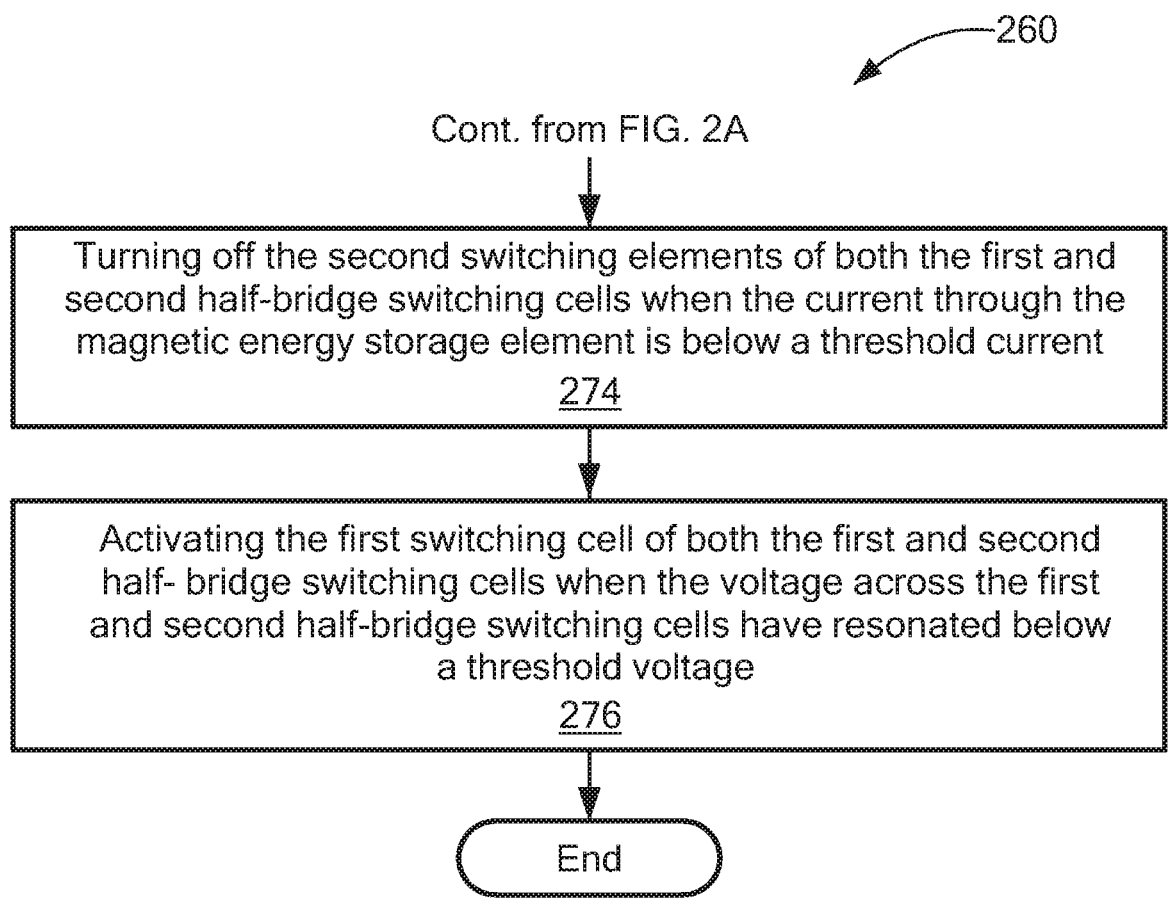

Now referring to FIGS. 2A-2B, a method 260 for converting power across wide voltage and power ranges while maintaining zero voltage switching in a modified boost mode using a converter circuit which may be the same as or similar to the converter circuits described above in conjunction with FIGS. 1-1B, begins at block 262, by providing a source voltage to a converter circuit having first and second half-bridge switching cells. The converter circuit includes first and second half-bridge switching cells and can be configured to perform zero voltage switching and/or zero current switching over a wide operating range. One or more switching patterns can be generated by a controller coupled to the converter circuit and the controller can apply the switching patterns to the first and second half-bridge switching cells to achieve zero voltage switching and/or zero current switching for any combination of input and output voltages and for both directions of power transfer.

Each of the first and second half-bridge switching cells can include one or more switching elements that can be selectively controlled by a controller (e.g., controller 134 described above in conjunction with FIG. 1) to convert the source voltage from a first level to a second, different level. The source voltage can be converted from a variable positive voltage, a DC voltage, or an AC voltage that has been rectified or that may be rectified by co-opting some switching elements of the converter. To perform zero voltage switching and/or zero current switching, the switching elements can be selectively controlled such that they are switched (e.g., turned on and off) when there is zero voltage (or zero current) or substantially zero voltage across them. Thus, the one or more switching patterns can be generated using the controllable switching elements to convert the source voltage to a desired output voltage.

At block 264, a magnetic energy storage element coupling a first and a second center switching node of the first and second half-bridge switching cells, respectively, can be charged. At block 266, the first switching element of the second half-bridge switching cell can be opened to charge the second center switching node of the second half-bridge switching cell. In some embodiments, the controller can transmit a signal (e.g., turn-off signal) to a terminal of the first switching element to open the switching element.

With the first switching element of the second half-bridge switching cell in an open position, an LC resonant phase charges the center switching node of the second half-bridge switching cell (i.e., second center switching node) to an output voltage (e.g., $V_{out}$) of the converter circuit. In an embodiment, the LC resonant phase can result from the magnetic energy storage element (e.g., inductor) and a capacitive element (e.g., capacitance) coupled across the center switching node and a fixed potential. The capacitive element may include device capacitances and/or discrete capacitances. In some embodiments, this may be referred to as a direct delivery phase.

The capacitive element coupled across the second center switching node of the second half-bridge switching cell can be charged responsive to the opening the first switching element of the second half-bridge switching cell. The LC resonant phase may charge the capacitive element until a second switching element of the second half-bridge switching cell is activated (e.g., turned on). The converter circuit may transition into a "direct" delivery phase responsive to the second switching element being activated. The direct delivery phase may be held for a controlled or predetermined time period during which the current across the magnetic energy storage element decreases.

At block 268, a current through the magnetic energy storage element can be detected or inferred at or below a predetermined threshold. The current and/or voltage across the magnetic energy storage element can be monitored during operation of the converter circuit. A current threshold can be established such that when the current through the magnetic energy storage element is less than the current threshold, the second switching element of the second half-bridge is activated. In some embodiments, the current threshold may be set at zero. In other embodiments, the current threshold may be a nonzero minimum. It should be appreciated that the current threshold can be selected at a variety of different levels based at least in part on a particular application of the converter circuit. In some embodiments, the activation of the second switching element can be pre-determined, such as based on a predetermined time schedule. For example, current may be difficult to measure properly at certain frequencies (e.g., high frequencies) and the current through the magnetic energy storage element can be inferred based on a time factor corresponding to the time schedule.

At block 270, the first switching element of the first half-bridge switching cell can be opened to discharge the first center switching node of the first half-bridge switching cell. At block 272, a second switching element of the first half-bridge switching cell can be activated to couple the first center switching node to at a voltage threshold, for example and without limitations, substantially zero volts.

At block 274, the second switching elements of both of the first and second half-bridge switching cells can be turned-off responsive to the current through the magnetic energy storage element being below a predetermined threshold current. At block 276, the first switching cells of both of the first and second half-bridge switching cells can be activated responsive to the voltage across the first and second half-bridge switching cells being detected to have resonated below a voltage threshold (e.g., zero volts).

Referring now to FIGS. 2C-2F, a series of schematic diagrams which illustrate a switching pattern for an example embodiment of resonant-transition boost mode operating phases for a converter circuit 220 which may be the same as or similar to the converter circuit described above in conjunction with FIG. 1.

Circuit 220 includes first and second half-bridge switching cells 228, 238, capacitive elements 234, 244 disposed between switching nodes (identified as nodes A and B in FIGS. 2C-2F) of each cell and fixed potentials (which may comprise device capacitances, discrete capacitances, or both) and a magnetic energy storage element 236 coupling the switching nodes of each half-bridge switching cell.

First and second half-bridge switching cells 228, 238 may include one or more active devices, one or more passive devices or a combination of active and passive devices. For example, first half-bridge switching cell 228 includes a first switching element 230 and a second switching element 232. Second half-bridge switching cell 238 includes a first switching element 242 and a second switching element 240. In the illustrative embodiments of FIGS. 2C-2F, the first switching elements 230, 242 are provided as switches and can be implemented as FETs. In an embodiment, the switch symbol may be used to illustrate when the first switching elements 230, 242 are open or closed (i.e. to illustrate at which points in time the FETs are biased into their conduction or low impedance states also referred to as their "on" states). The second switching elements 232, 240 are provided as diodes in both first and second half-bridge switching cells 228, 238. However, it should be appreciated that first and second half-bridge switching cells 228, 238 can be designed having a variety of different combinations of active devices, passive devices or a combination of active and passive devices.

Capacitive elements 234, 244 may include device capacitances, discrete capacitances (e.g., capacitors) or a combination of device capacitances and discrete capacitances. For example, capacitive elements 234, 244 may include parasitic capacitance coupled across the active devices and/or passive devices making up first and second half-bridge switching cells 228, 238. The parasitic capacitance may include a net lumped parallel device capacitance from the devices (e.g., active devices, passive devices) used to form the respective half-bridge switching cell.

A source voltage 222 is coupled to circuit 220 and can be converted using first and second half-bridge switching cells 228, 238 to an output voltage 250 at a desired voltage level. An input capacitor 226 is coupled between an input of first half-bridge switching cell 228 and a fixed potential and an output capacitor 246 is coupled across an output terminal of second half-bridge switching cell 238 and the fixed potential.

Figure 2C:
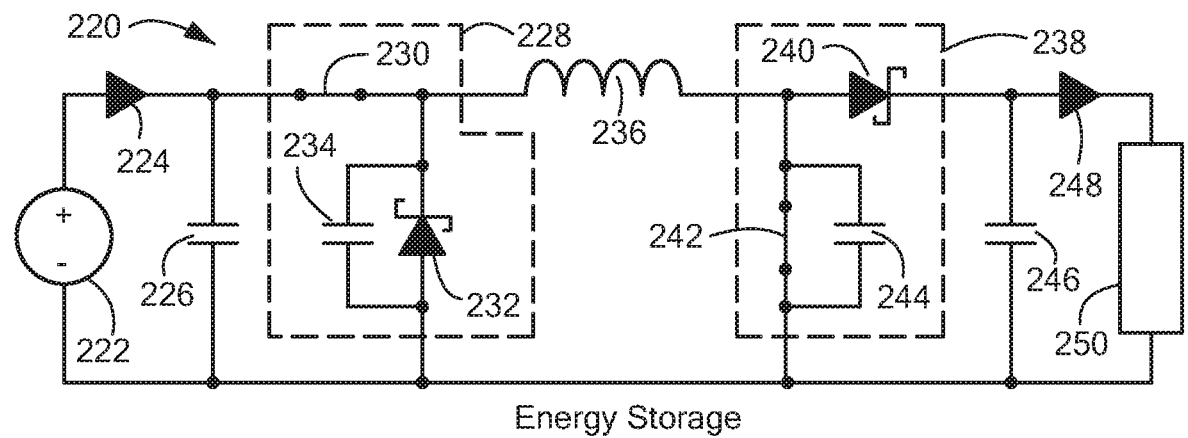
FIGS. 2C-2F are a series of schematic diagrams which illustrate resonant-transition boost mode operating phase and corresponding conduction paths.
Figure 2D:
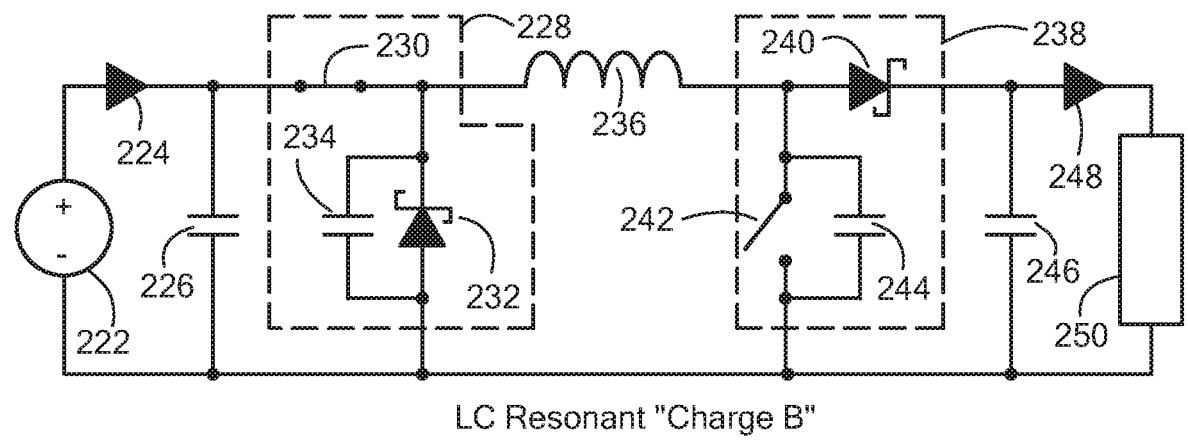
Figure 2E:
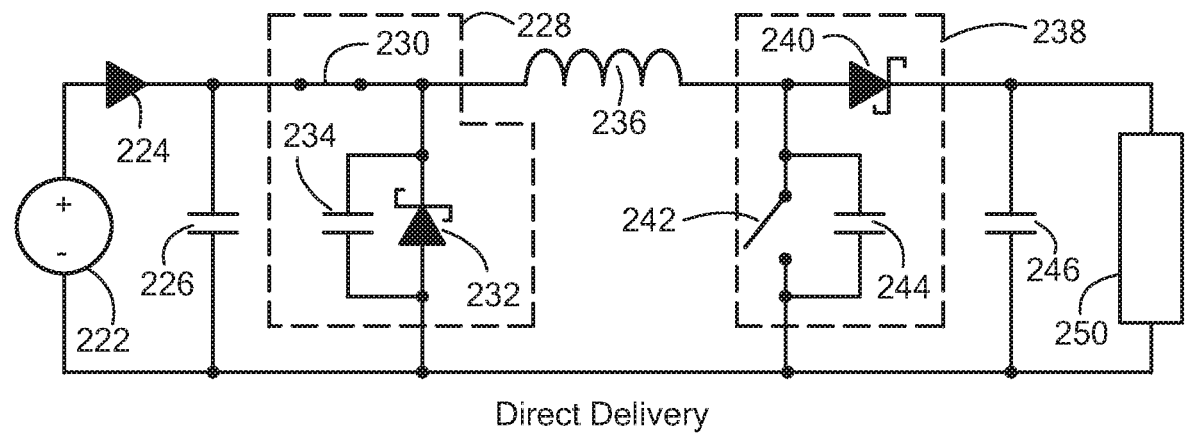
Figure 2F:
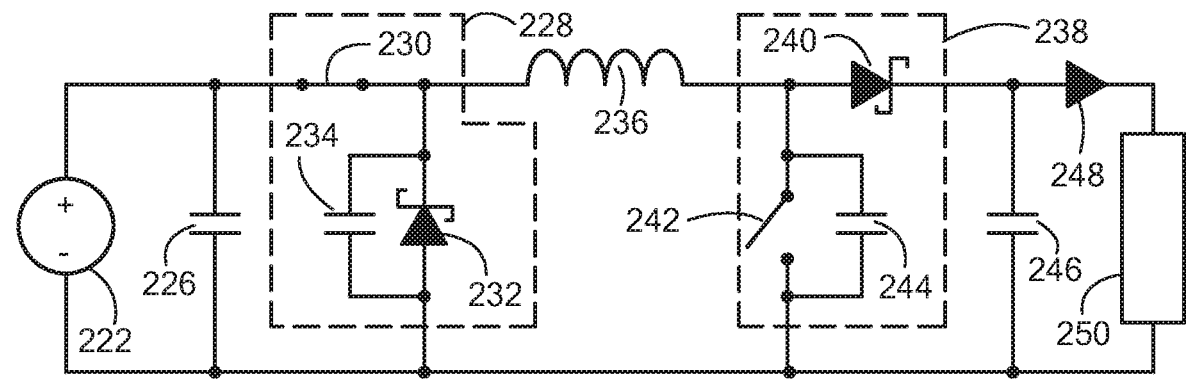

Referring to FIG. 2C, in resonant-transition boost mode, first switching element 230 of first half-bridge switching cell 228 can be perpetually on such that circuit 220 provides a boost (voltage step-up) conversion function. In the first phase, referred to herein as the "energy storage phase," first switching element 242 of second half-bridge switching cell is closed and energy is stored in the magnetic energy storage element 236 (here illustrated as an inductor). In other embodiments, first switching element 242 of second half-bridge switching cell is open and first half-bridge switching cell 228 can be perpetually on such that circuit 220 provides a voltage step-down conversion function. For example, performing a step-down voltage function can be performed on input voltage source 222 by opening the first switching element of the second half-bridge switching cell and activating the first half bridge switching cell.

In a second phase, first switching element 242 can be turned off, resulting in an LC resonant phase that charges node B (i.e., second center switching node) to the output voltage 250 (e.g., $V_{out}$). At this point, element 240 can be turned on and the converter circuit 220 enters the direct delivery phase (it should be appreciated that a diode implementation of element 240 may automatically turn on without external control).

The delivery phase lasts until the magnetic energy storage element current decreases to zero or below a current threshold and second switching element 240 of second half-bridge switching cell turns off. It should be appreciated that the current threshold need not be detected directly (though it may be), but can be inferred from the timing of the previous phases.

In some embodiments, the final phase of the resonant-transition boost mode is a "reset" phase which will let node B ring down to zero (i.e., fall to zero) or below a voltage threshold (e.g., substantially zero) volts to achieve zero voltage switching (ZVS) or, in some cases, a nonzero but reduced voltage at which first switching element 242 is turned on.

The equivalent circuit for the reset phase can be a resonant LC circuit with a low impedance offset voltage (i.e. the input voltage source 222) and includes the capacitance of the second center switching node (i.e., node B). The voltage at the second center switching node (i.e., node B) can resonate from $V_{in}+(V_{out}-V_{in})$ to $V_{in}-(V_{out}-V_{in})$. Thus, in the standard boost mode, the second center switching node (i.e., node B) may not fall to zero volts; instead it will only do so if $V_{in}<V_{out}/2$. However, the resonant-transition boost mode reset phase described herein ends with the first switching element turning on either when the second center switching node (i.e., node B) reaches zero (or a predetermined voltage threshold) volts or its minimum (or approximately minimum) nonzero voltage. If first switching element 242 is implemented with a FET, as before, its (equivalent) body diode will clamp the second center switching node (i.e., node B) to zero if it otherwise would have gone negative, easing the precision required for control.

Thus, the resonant-transition boost operating mode allows first switching element 242 to turn on with zero volts across it (for certain conversion ratios). The loss associated with switching is ideally zero, and the switching frequency can be increased without this penalty.

In addition, the architecture and methods described herein allow the converter to switch between modes. For example, the converter circuit 220 can operate in resonant-transition boost mode for $V_{in}<V_{out}/2$ and can transition to modified boost mode (explained herein below) for $V_{in}>V_{out}/2$ (or a similar threshold) to maintain ZVS. This is useful for wide input voltage dc-dc conversion or ac-dc power factor correction which can convert over most or all of the line cycle.

Figure 3:
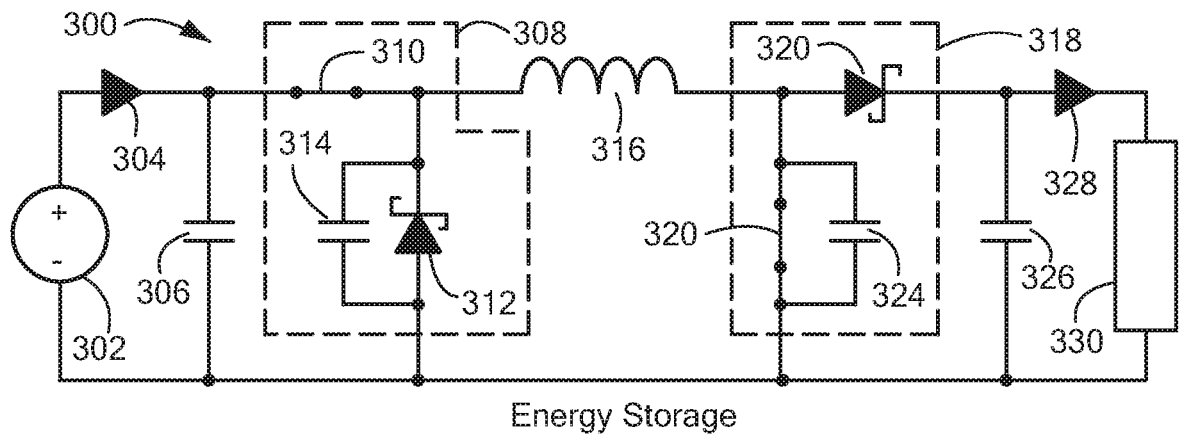
FIGS. 3-3E are a series of schematic diagrams which illustrate operating phases for modified boost mode and corresponding conduction paths.
Figure 3A:
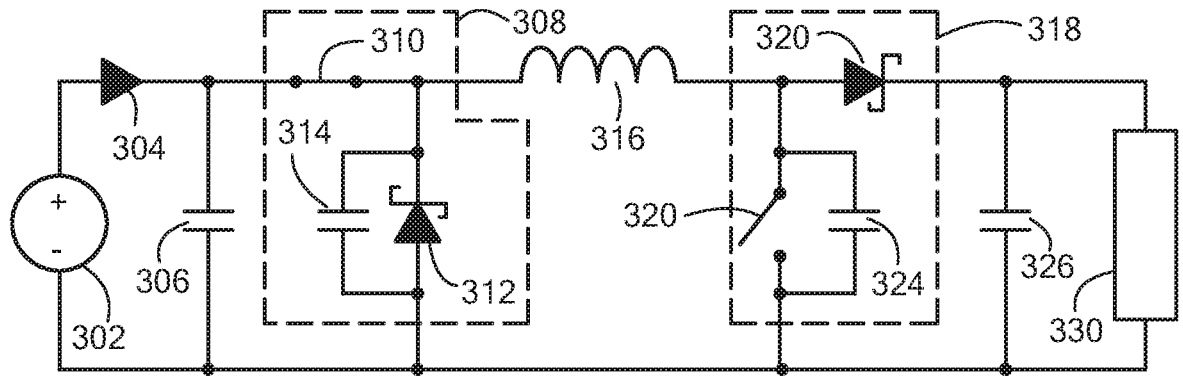
Figure 3B:
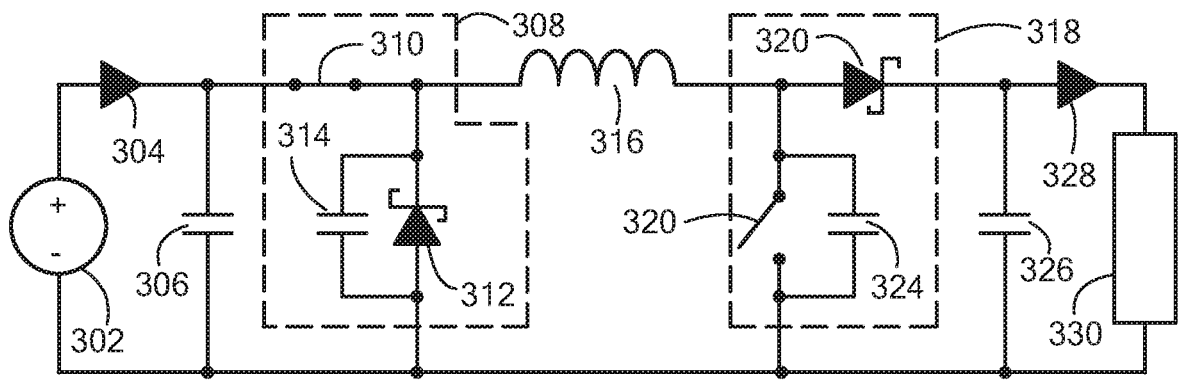
Figure 3C:
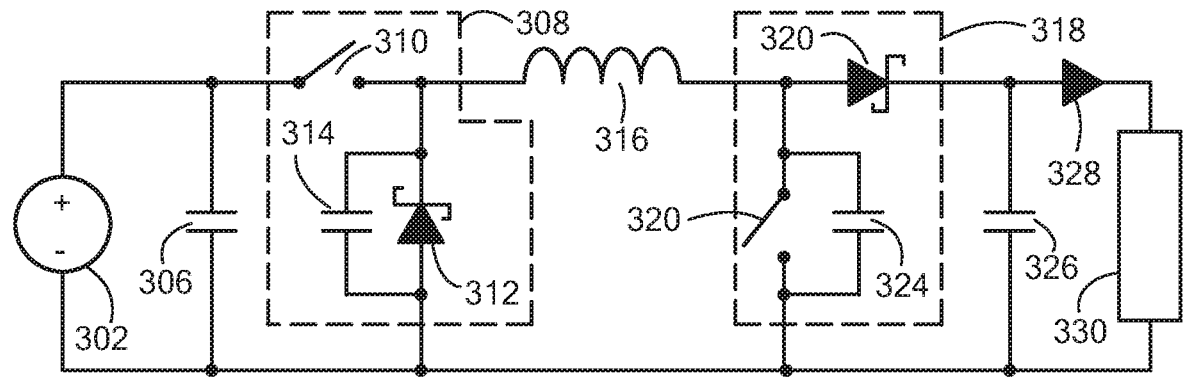
Figure 3D:
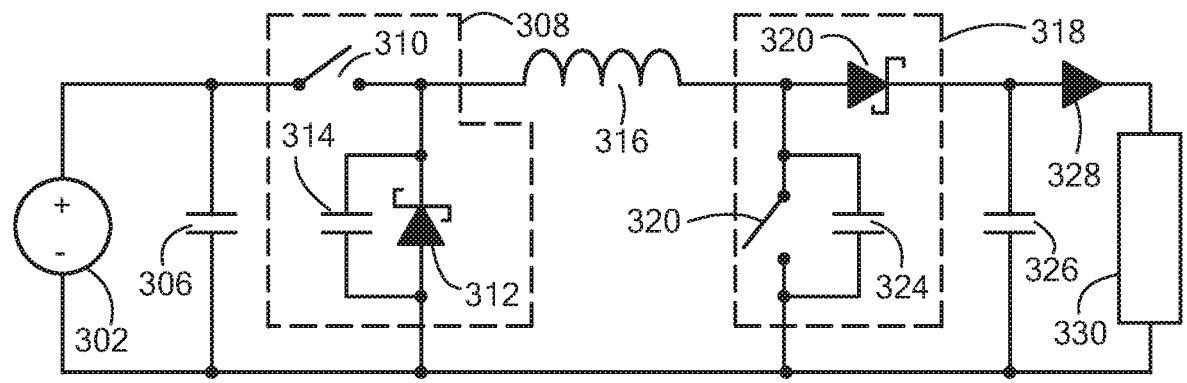
Figure 3E:
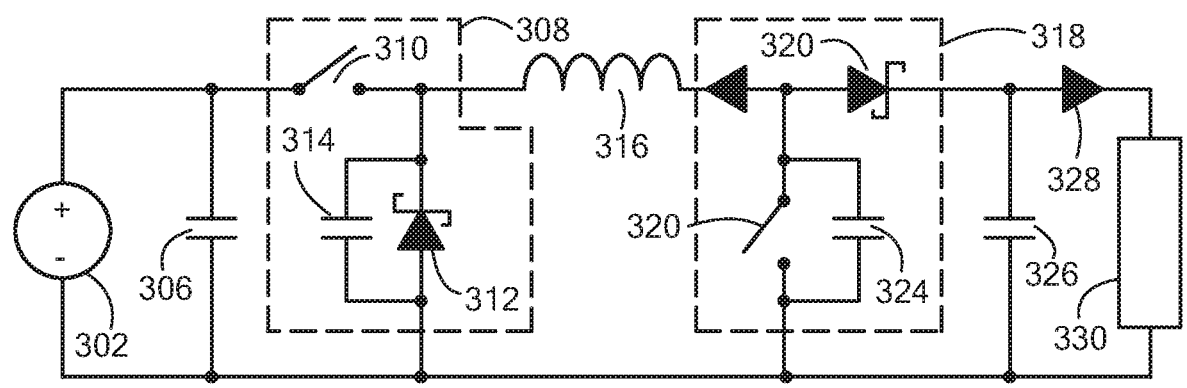

Referring now to FIGS. 3-3E, are a series of schematic diagrams which illustrates operating phases and switching patterns of another operating mode referred to as a modified boost mode for an example converter circuit embodiment which may be the same as or similar to the circuit of FIG. 1. The modified boost operating mode can overcome the voltage range limitation for achieving ZVS in the resonant-transition boost mode. The switching pattern for this mode illustrates the switch states and conduction paths for a sequence of six operating phases.

Circuit 300 includes first and second half-bridge switching cells 308, 318, capacitive elements 314, 324 disposed between switching nodes (identified as nodes A and B in FIGS. 3-3E) of each cell and fixed potentials (which may comprise device capacitances, discrete capacitances, or both) and a magnetic energy storage element 316 coupling the switching nodes of first and second half-bridge switching cells 308, 318.

First half-bridge switching cell 308 includes a first switching element 310 and second switching element 312. Second half-bridge switching cell 318 includes a first switching element 320 and second switching element 322. In the illustrative embodiments of FIGS. 3-3E, the first switching elements 310, 320 are provided as switches and can correspond to an FET. In an embodiment, the switch symbol may be used to illustrate when the first switching elements 310, 320 are open or closed (i.e. to illustrate at which points in time the FETs are biased into their conduction or low impedance states also referred to as their "on" states). The second switching elements 312, 322 are provided as diodes in both first and second half-bridge switching cells 308, 318. However, it should be appreciated that first and second half-bridge switching cells 308, 318 can be designed having a variety of different combinations of active devices, passive devices or a combination of active and passive devices.

Capacitive elements 314, 324 may include device capacitances, discrete capacitances (e.g., capacitors) or a combination of device capacitances and discrete capacitances. For example, capacitive elements 314, 324 may include parasitic capacitance coupled across the active devices and/or passive devices making up first and second half-bridge switching cells 308, 318. The parasitic capacitance may include a net lumped parallel device capacitance from the devices (e.g., active devices, passive devices) used to form the respective half-bridge switching cell.

A source voltage 302 is coupled to converter circuit 300 and can be converted using first and second half-bridge switching cells 308, 318 to an output voltage 330 at a desired voltage level. An input capacitor 306 is coupled between an input of first half-bridge switching cell 308 and a fixed potential and an output capacitor 326 is coupled across an output terminal of second half-bridge switching cell 318 and the fixed potential.

During a first phase (energy storage), both first switching elements 310, 320 (e.g., controlled switches) are closed and thus turned on and the magnetic energy storage element 316 current (here an inductor) increases, storing energy in its magnetic field. At a second phase, as shown in FIG. 3A, first switching element 320 of second half-bridge switching cell 318 is then turned off. An LC resonant phase charges the capacitance at node B until second switching element 322 (here a diode) of second half-bridge switching cell 318 turns on, at which point the converter circuit 300 enters a direct delivery phase (e.g., FIG. 3C). The direct delivery phase can be held for a controlled time, during which the magnetic energy storage element 316 current decreases.

First switching element 310 of first half-bridge switching cell 308 is then turned off (e.g., FIG. 3C). A CL resonant phase discharges the capacitance at node A until second switching element 312 (here a diode) of first half-bridge switching cell 308 turns on, at which point the converter circuit 300 enters the indirect delivery phase (e.g., FIG. 3D, energy supplied from the magnetic energy storage element previously stored). This phase can continue until the magnetic energy storage element 316 current reaches zero, or falls below a predetermined current threshold, at which point both the second switching element 312 of first half-bridge switching cell 308 and the second switching element 318 of second half-bridge switching cell 318 turn off and the converter circuit 300 enters the CLC resonant reset phase (e.g., FIG. 3E).

In the CLC reset phase, the capacitive elements 314, 324 (e.g., parasitic capacitances, discrete capacitances) and magnetic energy storage element 316 form an equivalent CLC resonant circuit, with initial conditions $V_A=0$ and $V_B=0$. Left alone, the first center switching node (i.e., node A) would ring to or otherwise rise to the output voltage 330 (i.e., $V_{out}$) and the second center switching node (i.e., node B) would ring to zero. Once the first center switching node (i.e., node A) reaches the source voltage (i.e., $V_{in}$) and the second center switching node (i.e., node B) reaches zero, each of the first switching elements 310, 320 are turned back on with ZVS, placing the converter circuit 300 back in the energy storage phase (i.e., FIG. 3A).

If the first switching element 310 of first half-bridge switching cell 308 and second switching element 322 of second switching cell 318 are implemented with power FETs (or other devices which effectively have body diodes), their (equivalent) body diodes will clamp the node voltages to approximately the source voltage (i.e., $V_{in}$) and zero, respectively, easing the precision required for control (explicit diodes can also be provided for this purpose). The turn-on or clamping of the first switching element 310 before the first center switching node (i.e., node A) can ring to the output voltage (i.e., $V_{out}$) is not a major interruption to the resonant process and actually allows the second center switching node (i.e., node B) to ring to zero even more quickly and reliably. Also note that it can be beneficial for operation (though not required) if the total capacitances at first and second center switching nodes (i.e., nodes A and B) are similar or identical.

While the modified boost mode can be used to boost across the whole input range $V_{in}<V_{out}$, it is most useful in the regime $V_{out}/2<V_{in}<V_{out}$, where other modes would not achieve ZVS. In some embodiments, for $V_{in}<V_{out}/2$, the converter circuit 300 can be operated in the resonant transition boost mode for improved efficiency and EMI.

It should be appreciated that other operating modes, beyond resonant-transition boost mode and modified boost mode can be implemented using the circuits and methods described herein. For example, using the hardware implementation of FIGS. 1-3E, the respective circuits can also step down voltages by operating the first half-bridge switching cell (i.e., A-side half-bridge) while leaving the first switching element of the second half-bridge switching cell off. Such an implementation allows for continuous conduction, boundary modes, with the ability to transition between those and other modes presented here.

For example, when operated near the edge of discontinuous conduction in buck mode, the resonant transitions afforded by the capacitances at the center switching nodes of the respective half-bridge switching cells (i.e., nodes A and B) can be used to reduce the turn-on voltage of the first switching element of the first half-bridge switching cell (i.e., active switch SA1). For identical capacitances at the center switching nodes of the respective half-bridge switching cells (i.e., nodes A and B), for example, the resonant transition when the second switching element of the second half-bridge switching cell (e.g., diode SB2) turns off allows the first switching element of the first half-bridge switching cell (i.e., SA1) to turn on with a reduced voltage of $V_{in}-V_{out}$ (rather than $V_{in}$). This achievable turn-on voltage can be further improved if the capacitances at the center switching nodes of the respective half-bridge switching cells are different, are appropriately nonlinear, or if there is reverse recovery of one or both diodes to pre-charge the resonant transition. This operational mode enables extension of the efficient operating range of the converter circuit implemented as in FIG. 1A.

The above buck and boost modes of operation can also be achieved with synchronous rectification by replacing the diodes in FIG. 1A, with active switches, as illustrated in FIG. 1B. For example, if the second switching element of the second half-bridge switching cell is replaced with an active device in modified boost mode, the required timing for it to act as a rectifier can be calculated. If the inductance, switching node capacitances, input/output voltages, and the energy storage phase duration are known, then the LC resonant transition time can be computed to indicate the correct turn-on moment for the second switching element of the second half-bridge switching cell. These values can all be readily available to a controller or control circuit, thus no current measurement is required.

The magnetic energy storage element current (e.g., inductor current) at that moment can also be computed without being measured, and together with the same circuit parameters can be used to compute the CL resonant discharge time and the indirect delivery time. The end of the indirect delivery time can be anticipated so that the second switching element of the second half-bridge switching cell can be turned off at the correct moment so that the device only passes forward current.

If the second switching element of the second half-bridge switching cell is implemented as an active device in parallel with a diode (or equivalent body diode), the active device can be turned on shortly after the calculated turn-on moment (the diode will conduct during this brief interval). Similarly, the active device may be turned off shortly before the calculated turn-off moment (the diode will again conduct until the inductor current actually reaches zero). These measures may help ensure that the whole switch implementation passes only forward current and blocks only reverse voltage (i.e. acts as a rectifier), even with some error in switch signal timing.

Figure 4:
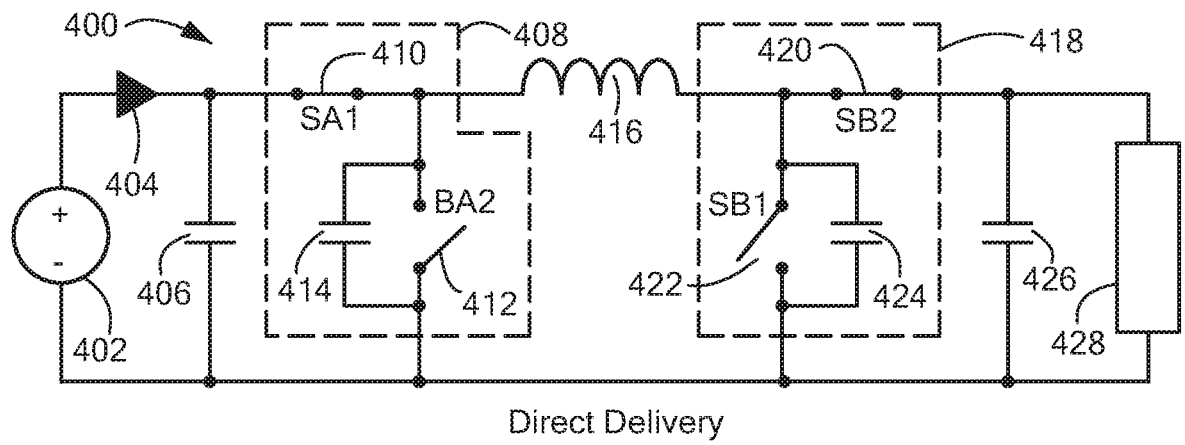
FIGS. 4-4C are a series of schematic diagrams which illustrate operating phases for resonant-transition buck mode and corresponding conduction paths.
Figure 4A:
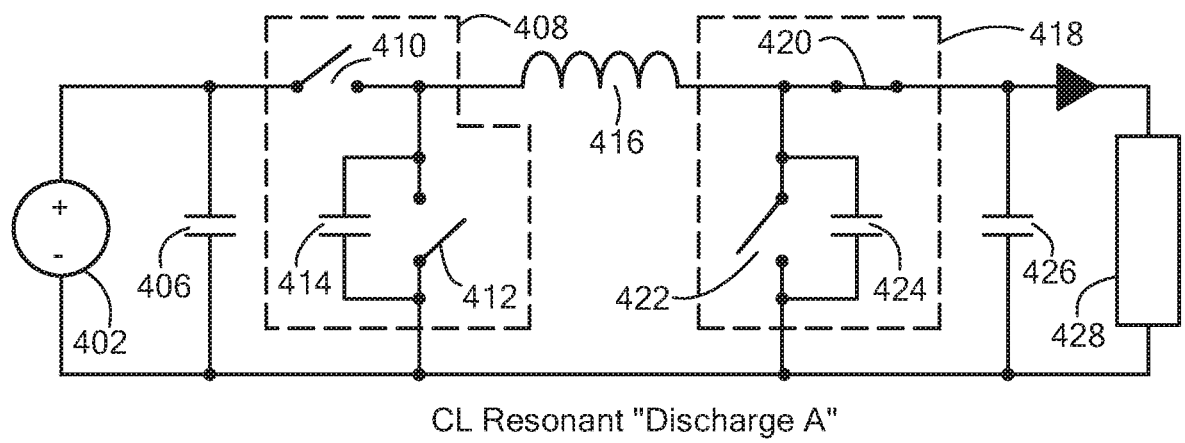
Figure 4B:
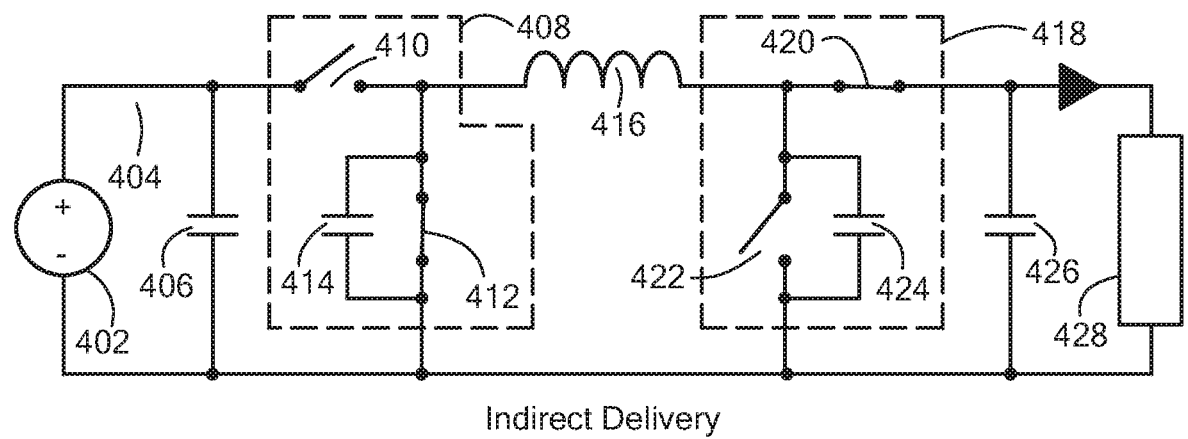
Figure 4C:
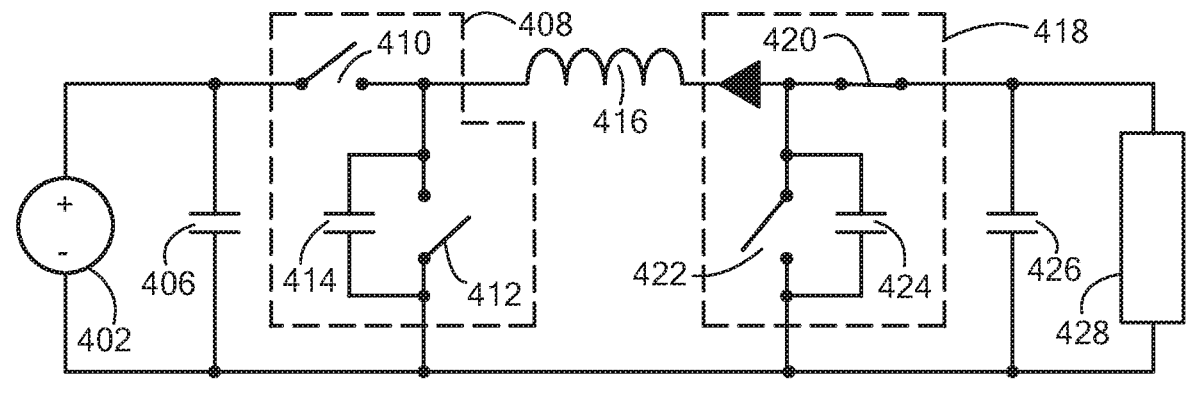

Referring now to FIGS. 4-4C, are a series of schematic diagrams which illustrates operating phases and switching patterns of another operating mode referred to as a resonant-transition buck mode for an example converter circuit embodiment which may be the same as or similar to the circuit of FIG. 1. In FIGS. 4-4C, an all-active-switch hardware implementation is provided, and the active devices have been illustrated as switches. However, it should be appreciated that the switches may correspond to FET devices.

Prior to describing the switching pattern, a brief description of converter circuit 400 is provided. Circuit 400 includes first and second half-bridge switching cells 408, 418, capacitive elements 414, 424 disposed between center switching nodes (identified as nodes A and B in FIGS. 4-4C) of each cell and fixed potentials (which may comprise device capacitances, discrete capacitances, or both) and a magnetic energy storage element 416 coupling the switching nodes of each half-bridge switching cell.

First half-bridge switching cell 408 includes a first switching element 410 and second switching element 412. Second half-bridge switching cell 418 includes a first switching element 420 and second switching element 422. In the illustrative embodiments of FIGS. 4-4E, first switching elements 410, 420 and second switching elements 412, 422 are provided as switches and can correspond to an FET. In an embodiment, the switch symbol may be used to illustrate when first switching elements 410, 420 and second switching elements 412, 422 are open or closed (i.e. to illustrate at which points in time the FETs are biased into their conduction or low impedance states also referred to as their "on" states).

Capacitive elements 414, 424 may include device capacitances, discrete capacitances (e.g., capacitors) or a combination of device capacitances and discrete capacitances. For example, capacitive elements 414, 424 may include parasitic capacitance coupled across the active devices and/or passive devices making up first and second half-bridge switching cells 408, 418. The parasitic capacitance may include a net lumped parallel device capacitance from the devices (e.g., active devices, passive devices) used to form the respective half-bridge switching cell.

A source voltage 402 is coupled to converter circuit 400 and can be converted using first and second half-bridge switching cells 408, 418 an output voltage 428 at a desired voltage level. An input capacitor 406 is coupled between an input of first half-bridge switching cell 480 and a fixed potential and an output capacitor 426 is coupled across an output terminal of second half-bridge switching cell 418 and the fixed potential.

In an embodiment, the all-active switch implementation of FIGS. 4-4C also allows for the use of additional operating modes. For example, by configuring converter circuit 400 such that the second switching element 420 of the second half-bridge switching cell 418 carries a bidirectional current, a resonant-transition buck mode can be achieved that provides full ZVS soft switching of the switching elements 410, 412, 422, 420 of converter circuit 400. In an embodiment, this mode has four phases, all phases having the second switching element 420 of the second half-bridge switching cell 418 closed and turned on and the first switching element 422 of the second half-bridge switching cell 418 open and turned off.

For example, and as illustrated in FIG. 4, first in the direct delivery phase, the first switching element 410 of the first half-bridge switching cell 408 is closed and turned on and the magnetic energy storage element 416 current increases. Next, the first switching element 410 of the first half-bridge switching cell 408 is then turned off (i.e., FIG. 4A) and the first center switching node (i.e., node A) is discharged in a CL resonant phase until it reaches zero volts or falls below a voltage threshold, at which point the second switching element 412 of the first half-bridge switching cell 408 turns on (i.e., FIG. 4B). It should be appreciated that in some embodiments, if second switching element 412 is implemented as a diode, this can happen automatically. The converter circuit 400 can next enter the indirect delivery phase (i.e., FIG. 4B). This phase can continue until the magnetic energy storage element 416 current reaches zero or falls below a current threshold, at which point the second switching element 412 of the first half-bridge switching cell turns off (again, if second switching element 412 is implemented or controlled to act as a diode this can happen automatically). The converter circuit 400 then enters a CL resonant reset phase (i.e., FIG. 4C). The first center switching node (i.e., node A) can rise to (ring up to) $2 \times V_{out}$, in some embodiments.

The first switching element 410 of the first half-bridge switching cell can be turned on either when the first center switching node (i.e., node A) reaches $V_{in}$ or, if $V_{in} > 2V_{out}$, when the first center switching node (i.e., node A) reaches its maximum or a predetermined voltage threshold (note that some FET implementations of the first switching element 410 will have a body diode which will clamp node A to $V_{in}$ if it reaches that high). For $V_{out} > V_{in}/2$, the switching element 408 can achieve ZVS. The second switching element 412 can also achieve ZVS at the beginning of the indirect delivery phase (i.e., FIG. 4B).

If the second switching element 412 is implemented as an active switch, the converter circuit 400 can additionally operate in a modified buck mode to provide a greater voltage range with ZVS. The phases of this mode follow as with the resonant-transition buck mode. However, in the indirect delivery phase, the second switching element 412 is left on when the magnetic energy storage element 416 current reaches zero. The converter circuit 400 remains in the same state, but the magnetic energy storage element 416 current can ramp in the negative direction (to the left) for a predetermined time period. When the second switching element 412 turns off, the magnetic energy storage element 416 current serves as an initial condition to the CL resonant reset phase and allows the first center switching node (i.e., node A) to reach $V_{in}$ to achieve ZVS on the first switching element 410.

Figure 5:
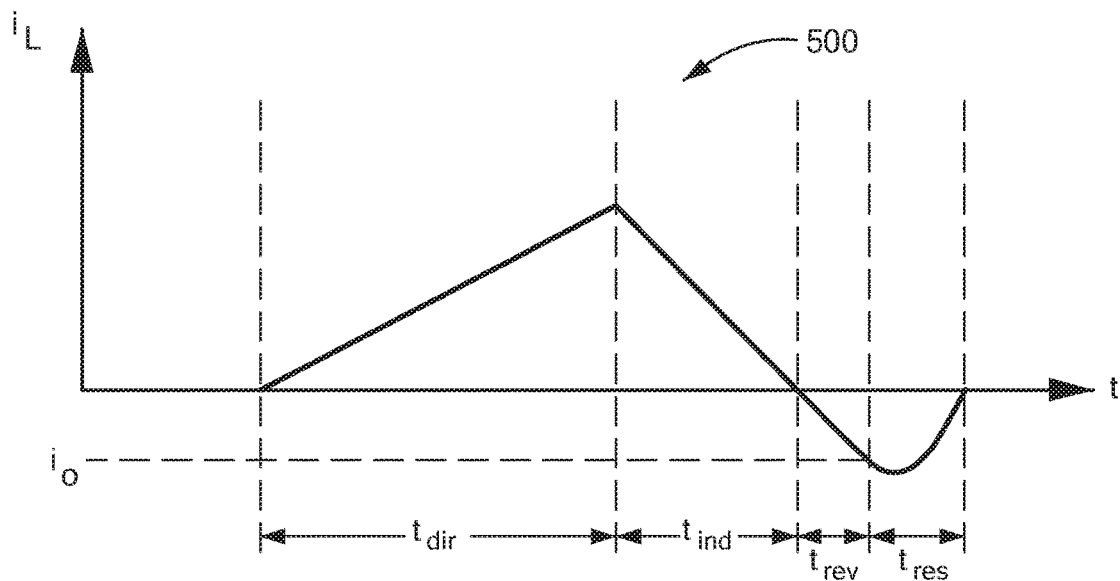
FIG. 5 is a plot of current vs. time which illustrates a modified buck mode inductor current.

Now referring now to FIG. 5, a plot 500 of modified buck mode inductor current is shown. The phase times are indicated for the direct delivery phase and resonant reset phase. The indirect delivery configuration is maintained past the point where $i_L$ crosses zero, building a reverse current through the second switching element of the first half-bridge switching cell; to emphasize this point, the indirect delivery time in the figure is split into positive current time $t_{ind}$ and reverse current time $t_{rev}$. This reverse current time allows the resonant phase to bring the first center switching node (i.e., node A) to $V_{in}$ and accomplish ZVS on the first switching element of the first half-bridge switching cell. Standard resonant-transition buck mode has a similar waveform with $t_{rev}=0$, but only achieves ZVS for a limited voltage range. FIG. 5 assumes that the switch parasitic capacitances are relatively small such that the CL resonant discharge of the first center switching node (i.e., node A) is fast enough to be ignored.

The required current and on-time can be calculated from the passive element values and the input/output voltages. If some current $i_0$ is assumed in the magnetic energy storage element (e.g., inductor) when second switching element of the first half-bridge switching cell turns off, then the time evolution of the voltage of the first center switching node (i.e., node A) during the resonant reset phase can be described by:

$$V_A = \frac{i_0}{C\omega_0}\sin(\omega_0 t) - V_{out}\cos(\omega_0 t) + V_{out} \quad \text{(Eq. 1)}$$

Where $$v_A(0) = 0,\ i_l(0) = i_C(0) = C\frac{dv_c}{dt} = i_0,$$

and the maximum voltage with no initial current would be $V_{A,max|i0=0} = 2V_{out}$ as in the resonant transition buck mode.

The maximum voltage on the first center switching node (i.e., node A) should reach at least to $V_{in}$, to achieve ZVS. In one approach, the time for this transition $t_{res}$ may be found by maximizing $v_a$:

$$\frac{i_0}{C}\cos(\omega_0 t_{pk}) + V_{out}(\omega_0 t_{pk})\sin(\omega_0 t_{pk}) = 0 \quad \text{(Eq. 2)}$$

$$\Rightarrow \omega_0 t_{pk} = \tan^{-1}\left(\frac{-i_0}{V_{out}\omega_0 C}\right)$$

In an embodiment, care should be taken such that the $\tan^{-1}$ function does not return an angle in the wrong quadrant. The expected angle lies between 90° (for very high initial current) and 180° (for zero initial current). This constraint can be applied directly to yield:

$$\omega_0 t_{pk} = 180° - \operatorname{atan}\left(\frac{i_0}{V_{out}\omega_0 C}\right) = 180° - \operatorname{atan}(\varphi)$$

where $\varphi$ is used as shorthand for the ratio in the argument of the arctangent and the a tan function always returns a value between 0 and 90 degrees for positive arguments. The following trigonometric identities are also useful:

$$\sin(180° - \operatorname{atan}(x)) = \frac{x}{\sqrt{x^2+1}}$$

$$\cos(180° - \operatorname{atan}(x)) = \frac{-1}{\sqrt{x^2+1}}$$

Equation (2) and the above trigonometric identities can be combined with equation (1) to give the peak voltage in terms of the initial current, $$v_{A,pk} = v_{pk} = v_{out}\varphi\left(\frac{\varphi}{\sqrt{\varphi^2+1}}\right) + \frac{1}{\sqrt{\varphi^2+1}} + v_{out} \quad \text{(Eq. 3)}$$

$$\Rightarrow \varphi = \sqrt{\left(\frac{v_{pk}}{v_{out}} - 1\right)^2 - 1}$$

$$\Rightarrow i_0 = v_{out} \sqrt{\frac{C}{L}} \sqrt{\left(\frac{v_{pk}}{v_{out}} - 1\right)^2 - 1}$$

where, to achieve ZVS, the initial current $i_0$ can be at least enough for the peak voltage to reach the input voltage ($v_{pk} \rightarrow V_{in}$ in equation 3).

To achieve this inductor current at the beginning of the resonant phase, second switching element of the first half-bridge switching cell can conduct reverse current for $t_{rev}$ in the previous phase (indirect delivery). This time is given by:

$$t_{rev} = \frac{Li_0}{v_{out}} = \sqrt{LC} \sqrt{\left(\frac{v_{in}}{v_{out}} - 1\right)^2 - 1} \quad \text{(Eq. 4)}$$

For purposes of control, the desired value is the total on-time for the second switching element of the first half-bridge switching cell, which is on for the entire indirect delivery phase, i.e. $t_{ind}+t_{rev}$. The magnetic energy storage element inductor current during both the direct delivery and indirect delivery phases is linear in time, so the on-time for the second switching element (i.e., $t_{SA2}$) is given by:

$$t_{SA2-on} = t_{ind} + t_{rev} = \frac{v_{in} - v_{out}}{v_{out}} t_1 = \sqrt{LC} \sqrt{\left(\frac{v_{in}}{v_{out}} - 1\right)^2 - 1} \quad \text{(Eq. 5)}$$

Thus, the on time required for the second switching element of the first half-bridge switching cell in order to ultimately achieve ZVS on the first switching element of the first half-bridge switching cell can be calculated based on the on-time of the first switching element, passive component values, and the input/output voltages. It should be appreciated that this technique requires no current measurement which becomes difficult at high frequency.

To achieve switching patterns like those described above with respect to FIGS. 1-5, one or more switching elements used to form the half-bridge switching cells can be selectively controlled (e.g., turned on or off) to convert a source voltage to a desired output voltage level while maintaining zero voltage switching. For example, in some embodiments, a respective one or multiple ones of the switching elements (e.g., active devices) can be turned on in response to zero voltage detection (or a voltage detected below a voltage threshold) and turned off in response to a local timer circuit. As the voltage across the switching element approaches zero (or the voltage threshold), the controller coupled to the circuit or the circuit itself can generate a turn-on signal and provides the turn-on signal to the switching element. This signal can also be used to start a timer which generates a turn-off signal upon reaching a predetermined time threshold. For example, in some embodiments, a timing circuit can be coupled to the switching element and can generate the timing signal.

Thus, the switching element (e.g., FET) can be turned on (with ZVS) and held on for a specified time. In some embodiments, this circuit can operate in an isolated voltage domain (possibly "flying") with circuit common nodes attached to a source terminal of the respective switching element. This approach can use only one voltage detection (i.e. the voltage from circuit common to the drain terminal of the respective switching element) and no fast communication with a ground-referenced voltage domain (or other main control voltage domain) if the source terminal of the switching element is not itself coupled to a reference potential, such as ground (or that domain). In an embodiment, this implementation allows the switching element to react to circuit conditions quickly, enabling high frequency operation.

One possible implementation of the above approach is illustrated in FIG. 6, which illustrates a circuit arrangement 600 having a logic device 650 (here a NOR logic gate) coupled to a terminal of a switching element 652 (here an FET or gate driver thereof). Switching element 652 can be the same as or substantially similar to any of switching elements described herein.

A first input of the logic device 650 is coupled to an output of a low voltage detection circuit 602 and a second input of the logic device 650 is coupled to an output of a timing circuit 630. In FIG. 6, the circuit reference potential is the source of switching element 652, which may not be at ground.

Low voltage detection circuit 602 includes a comparator 620 and a voltage divider 604 having a pair of capacitors 608, 612 and a pair of resistors 610, 614 forming the voltage divider circuit. An input voltage 606 is provided from a node voltage of a converter circuit (e.g., converter circuit 100 of FIG. 1) and the voltage divider 604 can be coupled to a reference potential 616. An output of the voltage divider 604a is provided to an input of comparator 620. A second input of comparator 620 is coupled to a reference voltage 618. The reference voltage 618 may include a zero voltage or a voltage threshold value.

Voltage divider 604 can monitor the voltage across switching element 652 using the node voltage provided from the converter circuit. The node voltage may correspond to a center switching node of a half-bridge switching cell the respective switching element 652 is a component of. When the voltage across switching element 652 falls below a voltage threshold or falls to zero volts, voltage divider 604 can generate and provide a low voltage that is proportional to the voltage across the switching element 652. The decrease in this voltage (i.e. during a resonant transition) trips the comparator 620, setting the comparator output 620a (e.g., low voltage signal, "ZVS" signal) low and at a first level, which turns the switching element 652 on. In some embodiments, responsive to the low voltage signal, a ramp generator can be activated and begin to increase the voltage from zero (or the voltage threshold). Voltage divider 604 may be connected to the switching node and be referenced to a reference potential, such as ground. A voltage rise may be compared to a reference and used to infer whether the voltage across the switching element 652 (e.g., first switching element 146 of FIG. 1A described above) is below the voltage threshold or falls to approximately zero volts.

The low voltage signal can be provided to timing circuit 630 to activate a timing signal. Timing circuit 630 includes a comparator 640 having a first input coupled to a drain terminal of an FET 634. For example, timer circuit 30 can be activated at the same time or substantially the same time a ZVS condition is detected, which can correspond to the same time FET 634 turns on. A gate terminal of FET 634 is coupled to and configured to receive the low voltage signal and a source terminal of FET 634 is coupled to a reference potential 642. A current source 636 is provided to the drain terminal of FET 634 and a capacitor is coupled between the drain terminal and the reference potential 642. A second input of comparator 640 is coupled to a reference voltage. The reference voltage 618 may include a zero voltage or a voltage threshold value. It should be appreciated that the current source is useful to provide a linear timing scheme. In other embodiments, however, a resistor may be provided in place of current source 636. In embodiments having a resistor, a ramp voltage may no longer be linear, so the circuit control can function with either the nonlinearity or a threshold voltage (e.g., Vtmr) can be controlled to account for the nonlinearity.

When the voltage provided from the ramp generator crosses the voltage threshold (i.e. after a predetermined time threshold), timing circuit 630 can generate a timing signal (e.g., "TMR" signal) that is set high (e.g., second level) which turns the switching element 652 off (for example, after possibly passing through other decision-making logic such as logic device 650). In an embodiment, when an input signal 632 (ZVS) is high, element 634 is on (i.e. biased into its conduction state), and the ramp voltage is "clamped" at approximately zero volts. When the input signal 632 (ZVS) is low, element 634 is turned off (i.e. biased into its non-conduction state), and the ramp generator may functions as an equivalent circuit current source feeding a capacitor. Thus, the ramp voltage increases linearly. The ramp voltage can cross the threshold voltage, Vtmr, after a predetermined time period. Thus, which may be computed this time is what may be controlled.

When the voltage across switching element 652 returns to a high value, the low voltage signal can be set high and at a second level. The switching element 652 stays off, element 634 is turned on by the low-voltage signal, the voltage from the ramp generator (e.g., ramp signal) can be reduced to zero. The ramp is then below the voltage threshold Vtmr, and the timing signal becomes low once again. The circuit is thus returned to its initial state, ready to respond when the zero voltage transition is again detected.

It should be appreciated that FIG. 6 provides but one embodiment of a control circuit 600 for controlling switching element 652 of a converter circuit. Control circuit 600 can be formed in a variety of different ways using different circuit components such that control circuit 600 can be configured to perform ZVS detection to turn the switching element 652 on and start a timer, which subsequently turns the switching element 652 off after a given period of time threshold.

In some embodiments, an isolated supply or bootstrap scheme may provide power to the control circuit 600. The required voltage thresholds $V_{ZVS}$ and $V_{TMR}$ can be slow-changing signals and therefore can be provided through a variety of signal isolation methods (optical, capacitive, magnetic, etc.) without the corresponding delays restricting the speed of the control circuit 600.

Figure 6A:
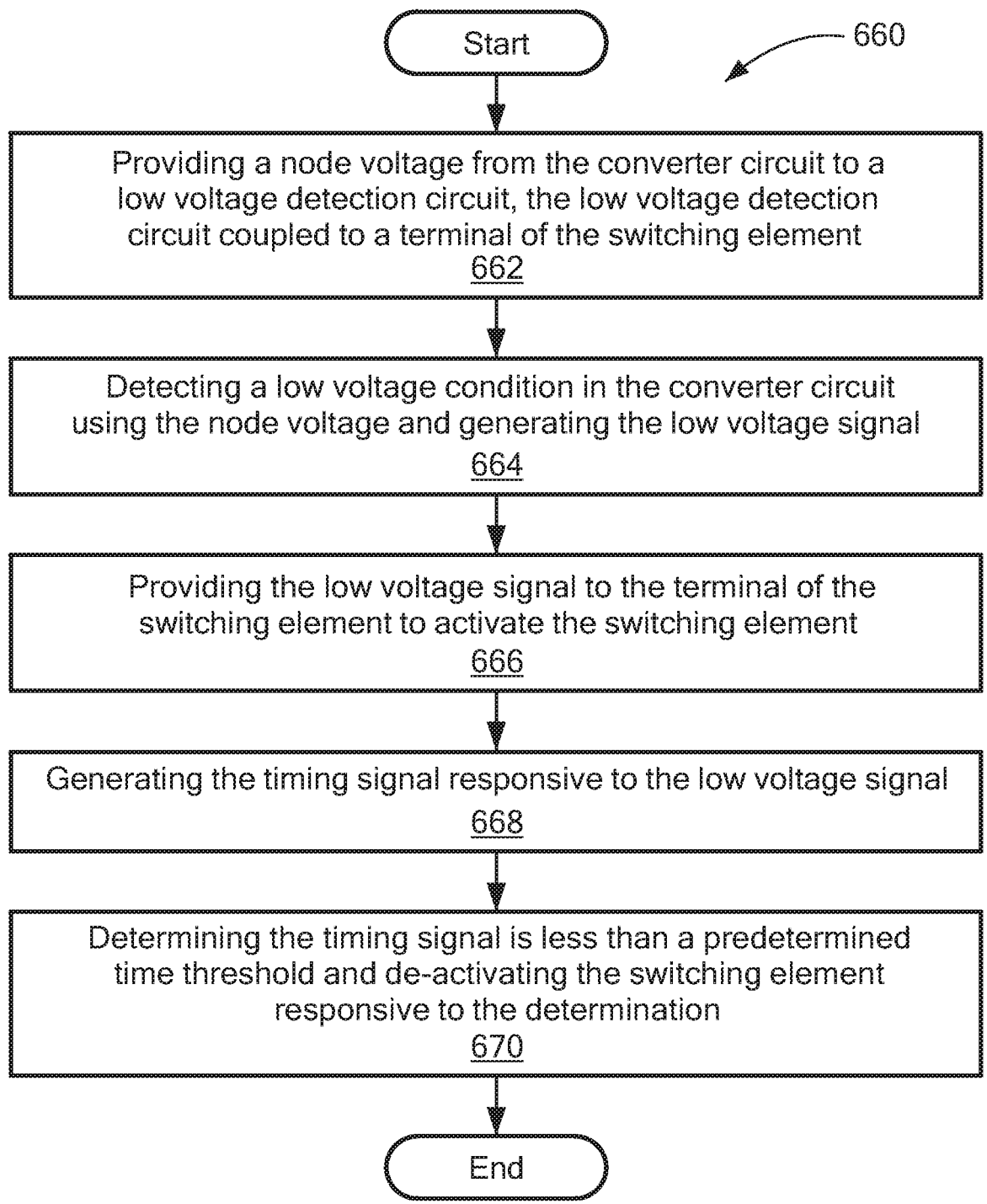
FIG. 6A is a flow diagram of a method for controlling a switching element of a converter circuit.

Referring now to FIG. 6A, a method 660 for controlling a switching element begins at block 662 by providing a node voltage from a converter circuit to a low voltage detection circuit. The low voltage detection circuit can be coupled to a terminal of the switching element to be controlled. The low voltage detection circuit can be configured to generate a low voltage signal and a timing signal. Low voltage may be detected directly (i.e. detecting 606 going low), or low voltage may be inferred. For example, in some embodiments, a switching element can be turned on when the voltage across it is low. In other embodiments, circuit 600 of FIG. 6 can be configured to monitor a voltage at first center switching node (e.g. relative to ground) and wait for the voltage at the first center switching node to rise to approximately equal to the input voltage (i.e., Vin). It can then be inferred that there are zero volts across the respective switching element.

In some embodiments, a logic device may be coupled to the terminal of the switching element and a first input of the logic device is coupled to an output of the low voltage detection circuit and a second input of the logic device is coupled to an output of a timing circuit.

At block 664, a low voltage condition is detected in the converter circuit using the node voltage and generating the low voltage signal. The low voltage condition may include a zero voltage condition or a voltage below a voltage threshold.

To detect the low voltage condition, the node voltage from a center switching node of the half-bridge switching cell can be provided to a voltage divider circuit formed within the low voltage detection circuit. In some embodiments, the node voltage may correspond to the voltage across the respective switching element being controlled.

The low voltage detection circuit may further include a comparator configured to compare an output of a voltage divider circuit to a voltage threshold to detect the low voltage condition.

If the output of the voltage divider circuit is less than the voltage threshold, the comparator can generate the low voltage detection signal at a first level. If the output of the voltage divider circuit is greater than or equal to the voltage threshold, the comparator can generate the low voltage detection signal at a second level.

At block 666, the low voltage signal can be provided to the terminal of the switching element to activate the switching element. For example, in one embodiment, the low voltage signal can be used to signal the switching element to turn on, through a combinatorial logic block.

At block 668, the timing signal can be generated responsive to the low voltage signal. In some embodiments, responsive to the low voltage condition, the timing circuit can be activated. For example, a ramp voltage can be applied to the timing circuit. The ramp voltage can be applied to the timing circuit for a predetermined time threshold (e.g., time limit), as determined by the ramp crossing a threshold voltage.

At block 670, the timing signal can be determined to be less than a predetermined time threshold and de-activating the switching element responsive to the determination. In an embodiment, when the time threshold is reached or when the timing signal is less than the predetermined time threshold, the timing signal can generate the timing signal at a second level to de-activate the switching element (e.g., turn off). In some embodiments, the timing signal can be generated at a first level responsive to the ramp voltage falling below a ramp voltage threshold.

It should be appreciated that the present disclosure is not restricted to a particular circuit implementation. For example, the core functions of circuit 600 (turning switching elements on with ZVS and turning them off after predetermined times) can be accomplished with a variety of circuit implementations. Further, in some embodiments, the switching elements can all be realized as controllable switches as illustrated in FIG. 4, resulting in a fully controllable topology. The embodiment of FIG. 4 can be useful for synchronous rectification (controlling switches to act as diodes to reduce conduction loss), for increasing the ZVS operating voltage range (FIG. 1b), as well as for bidirectional operation. In conjunction with appropriate operating modes utilizing resonant transitions, this allows the converter circuit to be effectively applied to such applications as battery interfaces for renewable energy storage or electric vehicles and grid-interface conversion from a bus with both generation and loads.

Similarly, the magnetic energy storage element is not restricted to implementation as a discrete inductor as illustrated in FIGS. 1-6A. For example, and now referring to FIG. 7, a converter circuit 700 includes a first and second magnetic energy storage elements 714, 716 (e.g., second winding on the same core as the first magnetic energy storage element 714) to yield a "balanced topology." In some embodiments, second magnetic energy storage element 716 can be formed by applying a second winding on the same core as the first magnetic energy storage element 714.

Circuit 700 includes first and second half-bridge switching cells 706, 720 having center switching nodes coupled to first and second magnetic energy storage elements 714, 716.

First half-bridge switching cell 706 includes a first switching element 708 and a second switching element 710. Second half-bridge switching cell 718 includes a first switching element 722 and a second switching element 720. Circuit 700 further includes capacitive elements 722 coupled across the first center switching node of first half-bridge switching cell 706 and a second capacitive element 724 coupled across the second center switching node of second half-bridge switching cell 718.

A source voltage 702 is provided to circuit 700 and circuit 700 can generate an output voltage 728. In some embodiments, an input capacitor 704 is coupled to an input of first half-bridge switching cell 706 and a reference potential and an output capacitor 726 is coupled to an output of second half-bridge switching cell 718 and a reference potential.

Figure 7:
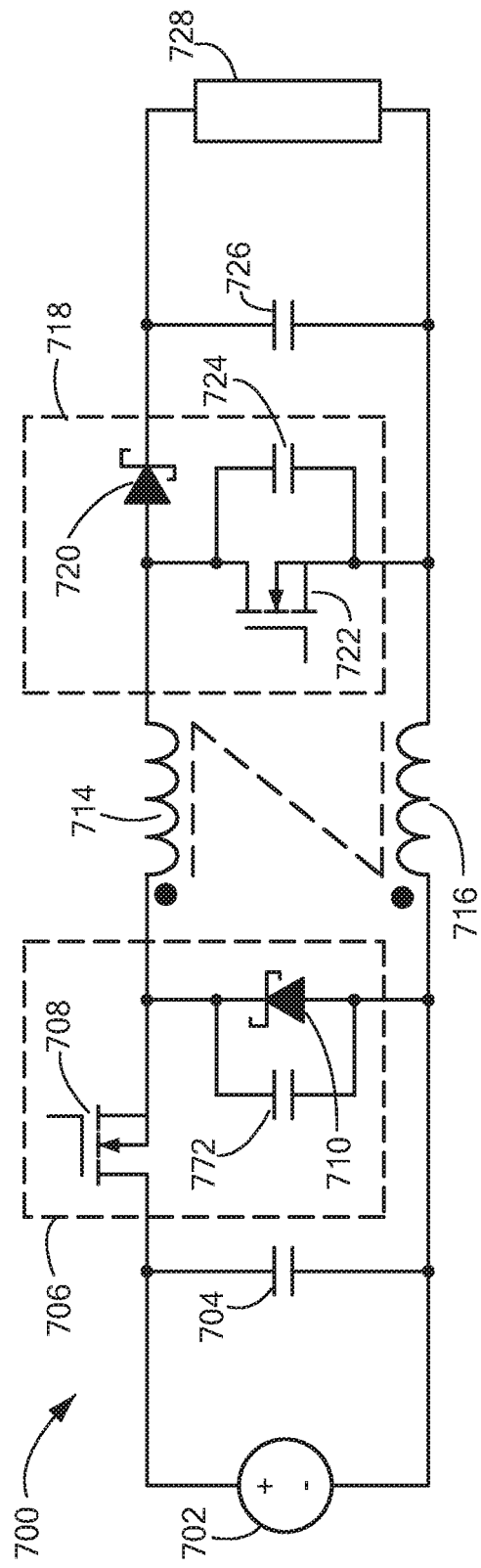
FIG. 7 is schematic diagram of a power stage inductor and common mode choke integrated on a single core.

In an embodiment, the arrangement of circuit 700 as illustrated in FIG. 7 can retain the same inductive energy storage feature of the other embodiments of the present disclosure described herein, while reducing common-mode noise generation and integrating some common-mode filtering without adding additional bulky components.

Figure 8:
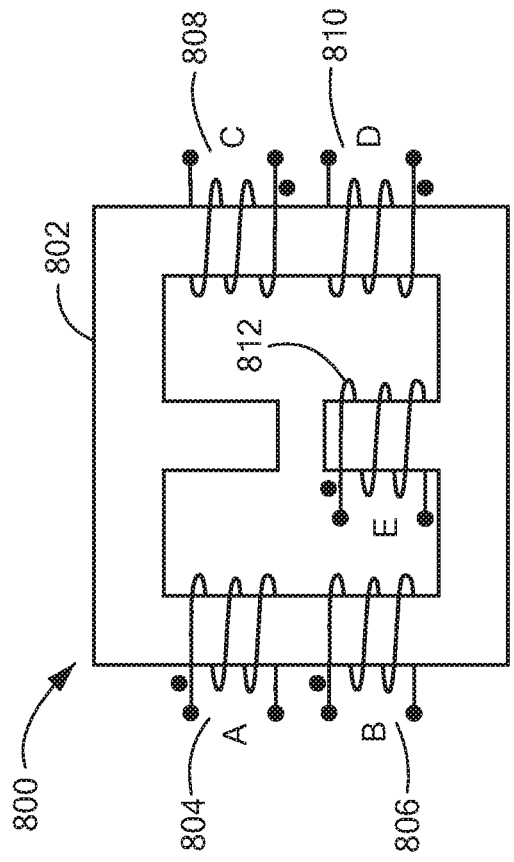
FIG. 8 is a diagram of a power stage inductor and common mode input choke integrated on a single core.

Now referring to FIG. 8, one embodiment of a power stage magnetic energy storage element 800 (e.g., inductor) and common mode input choke integrated on a single core 802 is illustrated. Magnetic energy storage element 800 includes multiples sets of windings (here five) 804, 806, 808, 810, 812 wrapped around core 802. In an embodiment, the center-leg winding 812 performs the same inductive energy storage function, while the additional outer windings 804, 806, 808, 810 create a choke on the input for common-mode filtering. Magnetic coupling from the center winding 812 induces voltages on the outer windings 804, 806, 808, 810, but these are arranged in the circuit such that the induced voltages cancel. Thus, the fundamental circuit operation is maintained while integrating filter components onto the same magnetic structure as the main capacitive element, potentially saving size and weight.

Figure 9:
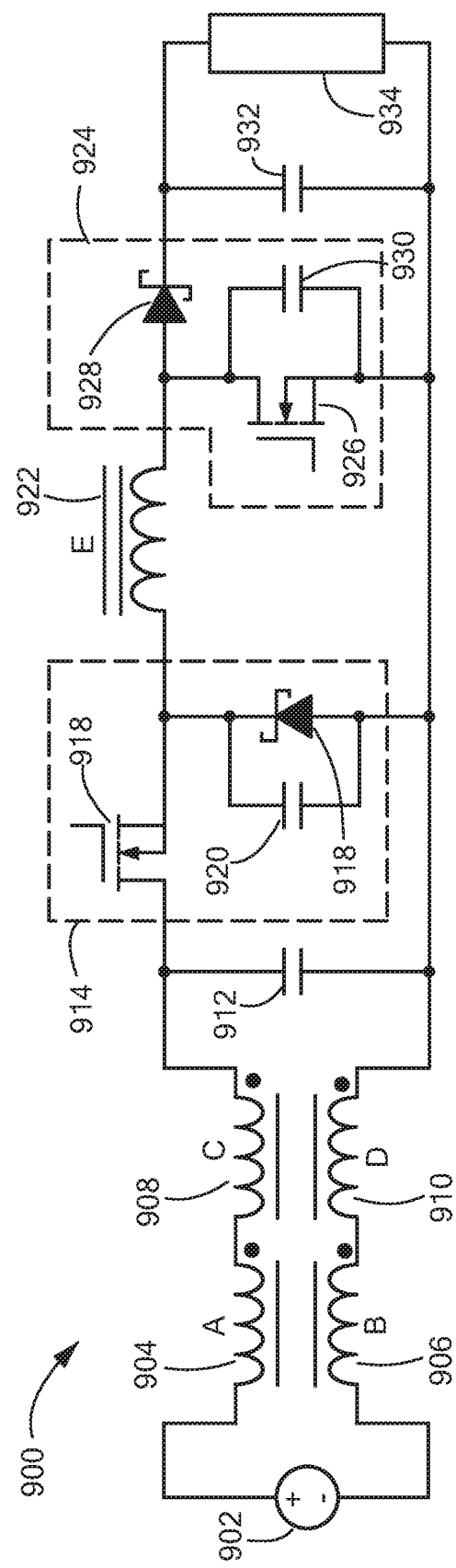
FIG. 9 is a schematic diagram illustrating a manner of connecting the magnetic structure from FIG. 8 into a circuit to achieve power conversion and common-mode filtering capabilities.

Now referring to FIG. 9, circuit 900 includes first and second half-bridge switching cells 914, 924 having center switching nodes coupled together by magnetic energy storage element 922.

First half-bridge switching cell 914 includes a first switching element 916 and a second switching element 918. Second half-bridge switching cell 924 includes a first switching element 926 and a second switching element 928. Circuit 900 further includes a first capacitive element 920 coupled across the first center switching node of first half-bridge switching cell 914 and a second capacitive element 930 coupled across the second center switching node of second half-bridge switching cell 924. An input capacitor 912 is coupled to an input of first half-bridge switching cell 914 and a reference potential and an output capacitor 932 is coupled to an output of second half-bridge switching cell 924 and a reference potential.

Circuit 900 includes multiple magnetic elements 904, 906, 908, 910 coupled between a source voltage 902 and an input to first half-bridge switching cell 914.

In an embodiment, magnetic energy storage element 922 forms a power stage magnetic energy storage element that is the same as or substantially similar to power stage magnetic energy storage element 800 of FIG. 8. In an embodiment, flux generated from magnetic elements 904, 906, 908, 910 (i.e., A-D) do not couple with magnetic energy storage element 922 (i.e., E). Flux generated by magnetic energy storage element 922 induces opposing voltages in magnetic elements 904, 908 (i.e., A/C) and magnetic elements 904, 908 (i.e., B/D) which cancel each other out.

The present disclosure can utilize soft switching techniques to achieve ZVS. For example, soft switching techniques can be used to achieve improved efficiency and/or frequency in power converters. However, many soft switching techniques and converters exhibit disadvantages and limitations in systems requiring wide operating ranges (e.g., wide voltage range operation).

One common class of soft switched circuits are resonant converters operated under frequency control. These converters operate above the resonant frequency in order to have an inductive load and achieve ZVS, and can increase frequency to reduce output power for light-load conditions. This often results in low light-load efficiencies. Sinusoidal waveforms, series-resonant tank voltages and parallel-resonant circulating currents place additional demands on the resonant elements, decreasing efficiency and/or power density. The present disclosure, by contrast, can operate over a wide power range, maintains ZVS, and can utilize pulse-width modulation (or time-based control) with only brief resonant transition phases with low circulating currents to provide soft switching. It shares some of these advantages with other soft-switched circuits providing resonant transitions.

While the techniques, system and methods described herein can use increased frequency to control power, they can also change operating modes and adjust the duration of different phases (changing distribution of the on-times of the switches). They therefore provide better control over frequency variations and waveform content and hence mitigate problems associated with wide frequency operation, including high losses and more strenuous requirements for magnetic design and EMI filters.

Resonant circuits with a full bridge inverter can also use phase-shift control. This technique has the advantage of operating at a single frequency. However, there are difficulties in achieving soft switching for all of the switches as well as achieving current sharing in the inverter legs, especially as power is varied. Other fixed frequency control techniques, such as asymmetrical clamped mode control and asymmetrical pulse width control, have also been developed. However, these also lose ZVS as the output power is reduced, losing efficiency. The present disclosure, by contrast, provides great flexibility to achieve efficient ZVS operation and desirable waveforms across a range of voltages and powers.

The high frequency capabilities of the proposed circuit and control approach are well matched to the capabilities of emerging devices and materials. Wide-bandgap semiconductor devices such as gallium nitride (GaN) and silicon carbide (SiC) devices have relatively small capacitances and are well matched to the high operating frequency capability of the proposed approach. Moreover, the relatively small inductances required for the proposed operating modes (which yield relatively high ripple in inductor currents) are well suited to the use of high-frequency magnetic materials such as powdered iron and ferrite core materials, including nickel-zinc (NiZn) ferrites having low permeabilities (e.g. $\mu_r$, 50).

The techniques, system and methods described herein can be especially well suited for high power factor grid-connected power conversion (e.g., from "Universal input" of 85-265 Vac, rms), where the most common PFC stage topology is a boost converter.

Boosting the grid voltage to a high voltage (e.g. 400 Vdc) bus can take advantage of high-density energy buffering capacitors. The boost converter also has an inductive element at its input, mitigating filter requirements. Nevertheless, the boost converter (and many of its variants) has significant limitations in moving to high frequency operation.

The standard continuous conduction, boundary conduction, or discontinuous conduction boost converter does not achieve ZVS and hence suffers increased losses at high frequency. Modifications like the zero-voltage-transition PWM boost converter introduce an auxiliary circuit that accomplishes ZVS for the main power switch, but at the cost of an auxiliary switch which does not have ZVS. Other forms like the quasi-resonant boost converter rely totally on frequency control to modulate output power. Devices can have higher ratings than in a typical PWM boost converter, and a large amount of resonant current causes high losses.

The resonant-transition boost converter can achieve ZVS when $V_{in}<V_{out}/2$. In one embodiment, this is sufficient for power factor correction from 120 Vac (grid voltages in the US) to a 400 Vdc bus (preferred for high density buffering capacitors). However, if the converter can interface with universal voltage requirements (up to 265 Vac, 375 Vpk), it may lose ZVS.

One possible operating mode of the present disclosure, the "modified boost mode," overcomes this problem and can achieve ZVS across the entire input voltage range. The present disclosure can also operate as a resonant-transition boost converter for input voltages up to or even slightly exceeding half the output voltage. In an embodiment, this mode can be used either during part of a high voltage line cycle, or constantly if operating on 120 Vac for a 400 Vdc output) to enhance efficiency and reduce EMI. Therefore, the present disclosure can be very well suited to this particular application. It should be emphasized that many other applications are possible, consistent with the adaptability of the present disclosure.

The techniques, system and methods described herein have a further advantage over the above approaches in that it can operate in different modes with a simple change in switching scheme and thereby achieve the advantages of each mode where it is most useful. For example, in a PFC architecture which uses a lower dc output voltage bus (e.g. $V_{out}=100V$, the converter could maintain ZVS across the entire universal input voltage range by operating in resonant-transition boost mode for $V_{in}<V_{out}/2$, in modified boost mode for $V_{out}/2<V_{in}<V_{out}$, in resonant transition buck mode for $V_{out}<V_{in}<2V_{out}$, and in modified buck mode for $V_{in}>2V_{out}$.

In general, by transitioning between modes the converter can achieve ZVS for any combination of $V_{in}$ and $V_{out}$, allowing it to operate efficiently at high frequency for wide ranges of input voltage, output voltage, and power. There are many other wide operating range applications for which the present disclosure would be advantageous over traditional approaches.

It should be appreciated that the present disclosure is applicable to many kinds of dc-dc and ac-dc power conversion. It is particularly well suited to high density, high frequency converters with wide voltage range requirements. These requirements are particularly strong in PFC stages, where converters can operate over very large voltage ranges and where size and weight are important parameters. These kinds of converters will achieve greater proliferation as worldwide agencies continue to implement more stringent power factor requirements and while the pressure for more efficient mobile device chargers increases.

It should be appreciated that the concepts and techniques described herein may be implemented or performed using circuits, such as a digital signal processor circuit, an application specific integrated circuit (ASIC), a field programmable gate array (FPGA), or conventional electrical or electronic systems or circuits. It should also be appreciate that some processing described herein may be manually performed, while other processing blocks may be performed by circuitry and/or one or more processors. It should be noted that unless otherwise indicated herein, the particular sequences or processes described are illustrative only and can be varied without departing from the spirit of the concepts described and/or claimed herein. Thus, unless otherwise stated, the processes described are unordered meaning that, when possible, the sequences described can be performed in any convenient or desirable order.

While particular embodiments of concepts, systems, circuits and techniques have been shown and described, it will be apparent to those of ordinary skill in the art that various changes and modifications in form and details may be made therein without departing from the spirit and scope of the concepts, systems and techniques described herein.

Having described preferred embodiments which serve to illustrate various concepts, systems circuits and techniques, which are the subject of this patent, it will now become apparent to those of ordinary skill in the art that other embodiments incorporating these concepts, systems circuits and techniques may be used. For example, it should be noted that individual concepts, features (or elements) and techniques of different embodiments described herein may be combined to form other embodiments not specifically set forth above. Furthermore, various concepts, features (or elements) and techniques, which are described in the context of a single embodiment, may also be provided separately or in any suitable sub-combination. It is thus expected that other embodiments not specifically described herein are also within the scope of the following claims.

In addition, it is intended that the scope of the present claims include all other foreseeable equivalents to the elements and structures as described herein and with reference to the drawing figures. Accordingly, the subject matter sought to be protected herein is to be limited only by the scope of the claims and their equivalents.

It should thus be appreciated that elements of different embodiments described herein may be combined to form other embodiments which may not be specifically set forth herein. Various elements, which are described in the context of a single embodiment, may also be provided separately or in any suitable subcombination. Other embodiments not specifically described herein are also within the scope of the following claims.

It is felt, therefore that the concepts, systems, circuits and techniques described herein should not be limited by the above description, but only as defined by the spirit and scope of the following claims which encompass, within their scope, all such changes and modifications.

All publications and references cited herein are expressly incorporated herein

What is claimed:

1. A multi-mode zero voltage switching converter circuit comprising:
    first and second half-bridge switching cells, each of the first and second half-bridge switching cells comprising a center switching node, at least two switching elements and a capacitive element, and each of the center switching nodes disposed between the at least two switching elements;
    a magnetic energy storage element coupling the center switching nodes of the first and second half-bridge switching cells; and
    a controller coupled to each of the first and second half-bridge switching cells, the controller configured to selectively switch at least two switching elements in each of the first and second half-bridge switching cells, wherein the magnetic energy storage element is configured to store energy when first switching elements of the first and second half-bridge switching cells are closed, wherein the center switching node of the second half-bridge switching cell is charged when the first switching element of the second half-bridge switching cell is open and wherein an output voltage is provided when a second switching element of the second half-bridge switching cell is closed, and wherein the controller is configured to open the second switching element of the second half-bridge switching cell when the current through a magnetic energy storage element disposed between the first and second half-bridge switching cells is below a threshold current, and wherein the controller is configured to close the first switching element of the second half-bridge switching cell when the voltage at the second switching node has resonated below a threshold voltage.

2. The circuit of claim 1, wherein the at least two switching elements include at least one controllable element, the at least one controllable element coupled to the controller.

3. The circuit of claim 1, wherein the at least two switching elements include one or more active devices, one or more passive devices, or a combination of active devices and passive devices.

4. The circuit of claim 1, wherein the capacitive element includes a parasitic capacitance value from the at least two switching elements, a discrete capacitance value or a combination of the parasitic capacitance value and the discrete capacitance value.

5. The circuit of claim 1, wherein the converter circuit is configured to operate in a resonant-transition boost mode of operation or a modified boost mode of operation.

6. The circuit of claim 1, further comprising one or more magnetic energy storage elements coupling the first and second half-bridge switching cells together.

7. The circuit of claim 1, further comprising a zero voltage detector coupled to the controller, the zero voltage detector configured to detect a zero voltage condition at least one of the center switching node, the at least two switching elements, or the capacitive element of each of the first and second half-bridge switching cells and the magnetic energy storage element.

8. The circuit of claim 7, further comprising the zero voltage detector coupled to a source voltage and an output voltage of the converter circuit, and wherein the zero voltage detector is configured to generate a zero voltage condition signal when a voltage at the center switching node of either the first or second half-bridge switching cells is less than or greater than a voltage threshold.

9. The circuit of claim 1, further comprising a zero current detector coupled to the controller, the zero current detector configured to detect a zero current condition at least one of the center switching node, the at least two switching elements, or the capacitive element of each of the first and second half-bridge switching cells and the magnetic energy storage element.

10. The circuit of claim 9, wherein the zero current detector is coupled to a source voltage and an output voltage of the converter circuit, and wherein the zero current detector is configured to generate a zero current condition signal when a current at the center switching node of either the first or second half-bridge switching cells is less than a current threshold.

11. A method for converting power and maintaining zero voltage switching, the method comprising:
    providing a source voltage to a converter circuit having first and second half-bridge switching cells, each of the first and second half bridge switching cells having one or more switching elements;
    storing energy in a magnetic energy storage element coupling a first and a second center switching node of the first and second half-bridge switching cells, respectively, wherein first switching elements of the first and second half-bridge switching cells are closed;
    opening, by a controller coupled to the first and second half-bridge switching cells, the first switching element of the second half-bridge switching cell to charge the second center switching node of the second half-bridge switching cell;
    activating, by the controller, a second switching element of the second half-bridge switching cell to provide an output voltage; and
    de-activating the second switching element of the second half-bridge switching cell when the current through a magnetic energy storage element disposed between the first and second half-bridge switching cells is below a threshold current; and activating the first switching element of the second half-bridge switching cell when the voltage at the second switching node has resonated below a threshold voltage.

12. The method of claim 11, further comprising: detecting a voltage at the second center switching node of the second half-bridge switching cell is less than a predetermined voltage threshold; and closing the first switching element of the second half-bridge switching cell.

13. The method of claim 11, further comprising: determining the source voltage provided to the converter circuit is greater than a fraction of an output voltage of the converter circuit; and transitioning the converter circuit from a first mode of operation to a second mode of operation.

14. The method of claim 11, further comprising, responsive to opening the first switching element of the second half-bridge switching cell, charging a capacitive element coupled to the second center switching node of the second half-bridge switching cell.

15. The method of claim 11, further comprising de-activating a first switching element of the first half-bridge switching cell to discharge a capacitive element coupled to the first center switching node of the first half-bridge switching cell.

16. The method of claim 15, further comprising activating a second switching element of the first half-bridge switching cell to draw magnetic energy from the magnetic energy storage element.

17. The method of claim 16, further comprising, responsive to detecting or inferring that the current across the magnetic energy storage element is less than the predetermined current threshold, de-activating the second switching element of the first half-bridge switching cell and de-activating the second switching element of the second half-bridge switching cell.

18. The method of claim 15, further comprising: detecting a voltage at the first center switching node of the second half-bridge switching cell is less than a predetermined voltage threshold; and activating the first switching element of the second half-bridge switching cell.

19. The method of claim 11, further comprising: performing a step-down voltage function on the source voltage by opening the first switching element of the second half-bridge switching cell and activating the first half bridge switching cell.

* * * * *